(12) United States Patent
Duppong

(10) Patent No.: US 10,214,351 B2
(45) Date of Patent: Feb. 26, 2019

(54) BARRIER PANEL ASSEMBLIES AND STORAGE RACK ASSEMBLIES INCLUDING SAME

(71) Applicant: J&L Wire Cloth, LLC, St. Paul, MN (US)

(72) Inventor: James A. Duppong, Lake Elmo, MN (US)

(73) Assignee: J&L WIRE CLOTH, LLC, St. Paul, MN (US)

(*) Notice: Subject to any disclaimer, the term of this patent is extended or adjusted under 35 U.S.C. 154(b) by 0 days.

(21) Appl. No.: 15/180,025

(22) Filed: Jun. 11, 2016

(65) Prior Publication Data

US 2016/0362250 A1     Dec. 15, 2016

Related U.S. Application Data

(60) Provisional application No. 62/174,151, filed on Jun. 11, 2015.

(51) Int. Cl.
    *B65G 1/02*             (2006.01)
    *A47B 55/02*           (2006.01)
    (Continued)

(52) U.S. Cl.
CPC .............. *B65G 1/02* (2013.01); *A47B 47/021* (2013.01); *A47B 55/02* (2013.01); *A47B 96/00* (2013.01); *B65G 2207/40* (2013.01)

(58) Field of Classification Search
CPC ...... B65G 1/02; B65G 2207/40; A47B 96/00; A47B 55/02; A47B 47/027; A47B 96/067; A47B 47/00; A47B 96/027; A47B 96/14; A47B 47/021; A47B 47/022; A47B 57/045; A47B 57/402; A47B 57/42; A47B 57/56; A47B 96/024; A47B 96/028; A47B 43/003; A47B 96/06; A47B 96/061; A47B 2220/0041; A47B 2220/0036; A47F 5/13; A47F 3/147; A47F 5/01; A47F 5/10; A47F 5/0838; A47F 5/08; A47F 5/083; A47F 5/0853
USPC .... 211/180, 183, 189, 181.1, 182, 187, 191, 211/90.03, 106, 106.01, 119.003, 107; 108/107, 181, 64, 193, 158.11; 248/250, (Continued)

(56) References Cited

U.S. PATENT DOCUMENTS 3,225,720 A * 12/1965 Maslow ................. A47B 55/02
                                                                   108/181
3,763,794 A * 10/1973 Fleck ..................... A47B 55/02
                                                                   108/181

(Continued)

*Primary Examiner* — Hiwot E Tefera
(74) *Attorney, Agent, or Firm* — Fay Sharpe LLP

(57) ABSTRACT

A barrier panel assembly includes a barrier sheet formed from a plurality of barrier wires arranged in a grid pattern and interconnected with one another by a plurality of flowed-material joints. Support brackets are secured to the barrier sheet along a common side thereof. The support brackets are configured to engage a rail of a storage rack structure that defines a storage bay disposed at a non-zero height above a base surface on which the storage rack structure is supported. A support deck that is dimensioned to form a floor of the storage bay and capture the support brackets between the storage deck and the rail to secure the barrier panel assembly on the storage rack structure. A method of assembly is also included.

20 Claims, 26 Drawing Sheets

(51) Int. Cl.
*A47B 47/02* (2006.01)
*A47B 96/00* (2006.01)

(58) Field of Classification Search
USPC .............. 248/214, 228.1, 226.11; 312/265.1, 312/265.5, 265.6
See application file for complete search history.

(56) References Cited

U.S. PATENT DOCUMENTS

| | | | | |
|---|---|---|---|---|
| 4,981,225 A * | 1/1991 | Cole | ........................ | B65G 1/02 |
| | | | | 211/180 |
| 5,601,038 A * | 2/1997 | Welch | .................... | A47B 55/02 |
| | | | | 108/107 |
| 6,241,107 B1 * | 6/2001 | Boyer | ..................... | A47F 5/137 |
| | | | | 211/106 |
| 6,802,146 B2 * | 10/2004 | Gay | ........................ | G09F 3/204 |
| | | | | 211/119.003 |
| 7,100,780 B1 * | 9/2006 | VanCalbergh | .......... | A47F 3/004 |
| | | | | 211/94.01 |
| 7,334,692 B2 * | 2/2008 | Black | .................... | A47B 47/025 |
| | | | | 211/106 |
| 7,832,572 B2 * | 11/2010 | Wyatt | .................. | A47B 47/027 |
| | | | | 211/181.1 |
| 8,631,965 B2 * | 1/2014 | Leasure | ................... | B65D 7/12 |
| | | | | 206/600 |
| 9,737,141 B2 * | 8/2017 | Johnson | ................. | A47B 55/02 |
| 2007/0023376 A1 * | 2/2007 | Black | ................... | A47B 47/025 |
| | | | | 211/187 |
| 2007/0175371 A1 * | 8/2007 | Wyatt | .................. | A47B 47/027 |
| | | | | 110/325 |
| 2008/0006595 A1 * | 1/2008 | Black | ................... | A47B 47/025 |
| | | | | 211/181.1 |
| 2016/0007740 A1 * | 1/2016 | Consaul | ................... | B65G 1/02 |
| | | | | 211/187 |

* cited by examiner

FIG. 28

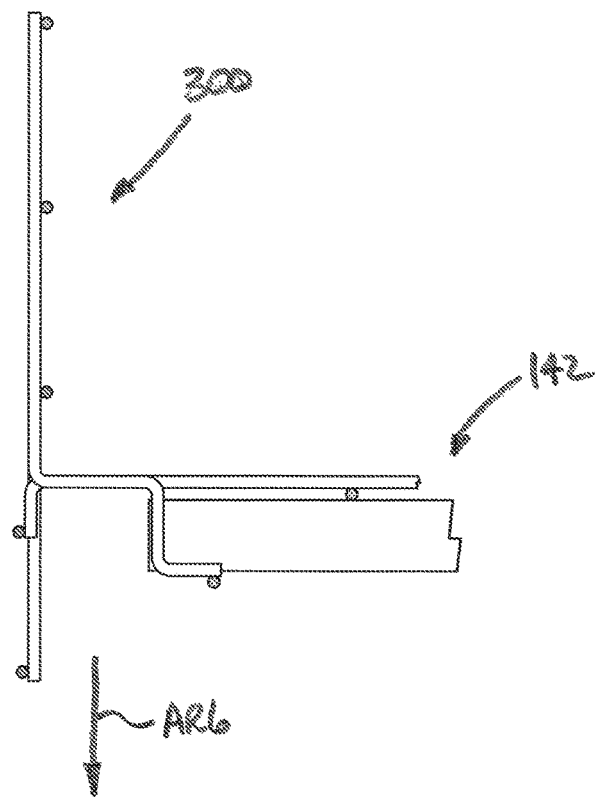
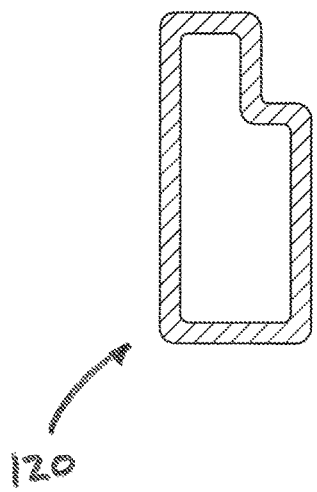
FIG. 30

BARRIER PANEL ASSEMBLIES AND STORAGE RACK ASSEMBLIES INCLUDING SAME

This application claims priority to U.S. Provisional No. 62/174,151, filed on Jun. 11, 2015, the contents of which is hereby incorporated herein by reference in its entirety.

BACKGROUND

The subject matter of the present disclosure broadly relates to the art of storage and shelving systems and, more particularly, to barrier panel assemblies dimensioned for support on an associated storage rack as well as storage rack assemblies that include one or more of such barrier panel assemblies.

Known storage and shelving systems commonly include a storage rack that is supported on a base surface, such as the floor of a building or the paved yard of an outside storage facility, for example. The storage rack is typically constructed from numerous structural columns and beams or rails that together form one or more storage bays that are elevated from the base surface. A storage deck is normally supported on the storage rack within each bay and functions as a support surface for the items and materials that are supported on the storage and shelving system. In many cases, the items and materials are palletized to facilitate transfer of the items and materials onto and off of the support surfaces.

Known storage and shelving systems are often arranged such that each bay normally includes a front or aisle opening, a rear opening and one or more side openings. In some cases, a backstop panel can extend across the rear opening of a storage bay and may be useful in substantially inhibiting the inadvertent displacement of items and materials through the rear opening of the bay, such as could occur during transfer of items and materials into and/or out of the storage bay. When employed, conventional backstop panels are commonly secured to the structural components (e.g., columns, beams and/or rails) of the storage rack using a plurality of threaded fasteners. In some cases, holes may need to be formed in the structural components to receive the threaded fasteners, such as may occur in retrofit installations in which backstop panels are being added to an existing storage structure. Additionally, in such cases, the formation of the holes and installation of the threaded fasteners will often be performed under elevated conditions (i.e., installation along storage bays above the base surface), which may lead to increase the care and deliberateness used during the installation process and, thus, undesirably increase the time and cost associated with installation of conventional backstop panels.

Notwithstanding any commercial success of conventional designs, it is believed that a need exists to overcome the foregoing and/or other disadvantages of known constructions while still retaining comparable or, preferably, improving factors such as performance, ease of manufacture, ease of assembly, ease of installation and/or reduced cost of manufacture. Thus, it is believed to be generally desirable to develop new constructions and/or designs that may advance the art of storage and shelving systems.

BRIEF DESCRIPTION

One example of a storage rack assembly in accordance with the subject matter of the present disclosure can be disposed on an associated base surface and can have a front side and a rear side. The storage rack assembly can include a storage rack structure that can include a plurality of columns and a plurality of beams. The plurality of beams can extend between and interconnect the plurality of columns such that a storage bay is formed at a non-zero height above the associated base surface. The storage bay can include a front opening and a rear opening. The storage rack assembly can also include a storage deck supported on the storage rack structure within the storage bay. The storage deck can operatively engage one or more of the plurality of beams to form a floor of the storage bay. The storage rack assembly can also include a barrier panel assembly that can extend across the rear opening of the storage bay. The barrier panel assembly can include a plurality of support brackets that can be captured between the storage deck and one or more of the plurality of beams to thereby secure the barrier panel assembly to the storage rack structure.

One example of a barrier panel assembly in accordance with the subject matter of the present disclosure can be dimensioned to be supported on an associated storage rack structure and to be captured thereon by an associated support deck. The associated storage rack structure can include an associated plurality of beams that at least partially define an associated storage bay. The associated plurality of beams can include at least an associated top surface. The barrier panel assembly can include a barrier sheet having an approximately rectangular shape with a sheet length and a sheet width. The barrier sheet can include a plurality of barrier wires that are arranged in a grid pattern and interconnected with one another by a plurality of flowed-material joints. The barrier panel assembly can also include a plurality of support brackets that can extend between a proximal end secured along the barrier sheet and a distal end opposite the proximal end. The plurality of support brackets can be configured to abuttingly engage the associated top surface of at least one of the associated plurality of beams. In this manner, the associated support deck can be supported on the associated plurality of beams overtop of at least one of the plurality of brackets to thereby capture at least one of the plurality of brackets and secure the barrier panel assembly on the associated storage rack structure.

One example of a method of assembling a storage rack assembly on a base surface in accordance with the subject matter of the present disclosure can include providing a storage rack structure that is supported on the base surface. The storage rack structure can include a plurality of beams that are supported on a plurality of columns and at least partially form a storage bay at a non-zero height above the base surface. The storage bay can include a front opening and a rear opening. The method can also include providing a barrier panel assembly that includes a barrier sheet and a plurality of support brackets that are secured to the barrier sheet. The method can further include positioning the barrier panel assembly across the rear opening of the storage bay and engaging at least some of the plurality of support brackets with one or more of the plurality of beams. The method can also include providing a storage deck that is dimensioned to form a floor of the storage bay. The method can further include positioning the storage deck on two or more of the plurality of beams such that at least some of the plurality of support brackets are captured between the storage deck and one or more plurality of beams to thereby secure the barrier panel assembly on the storage rack structure.

BRIEF DESCRIPTION OF THE DRAWINGS

FIG. 28-30 are exploded views of the portion of the storage rack assembly in FIGS. 26 and 27, shown during assembly.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
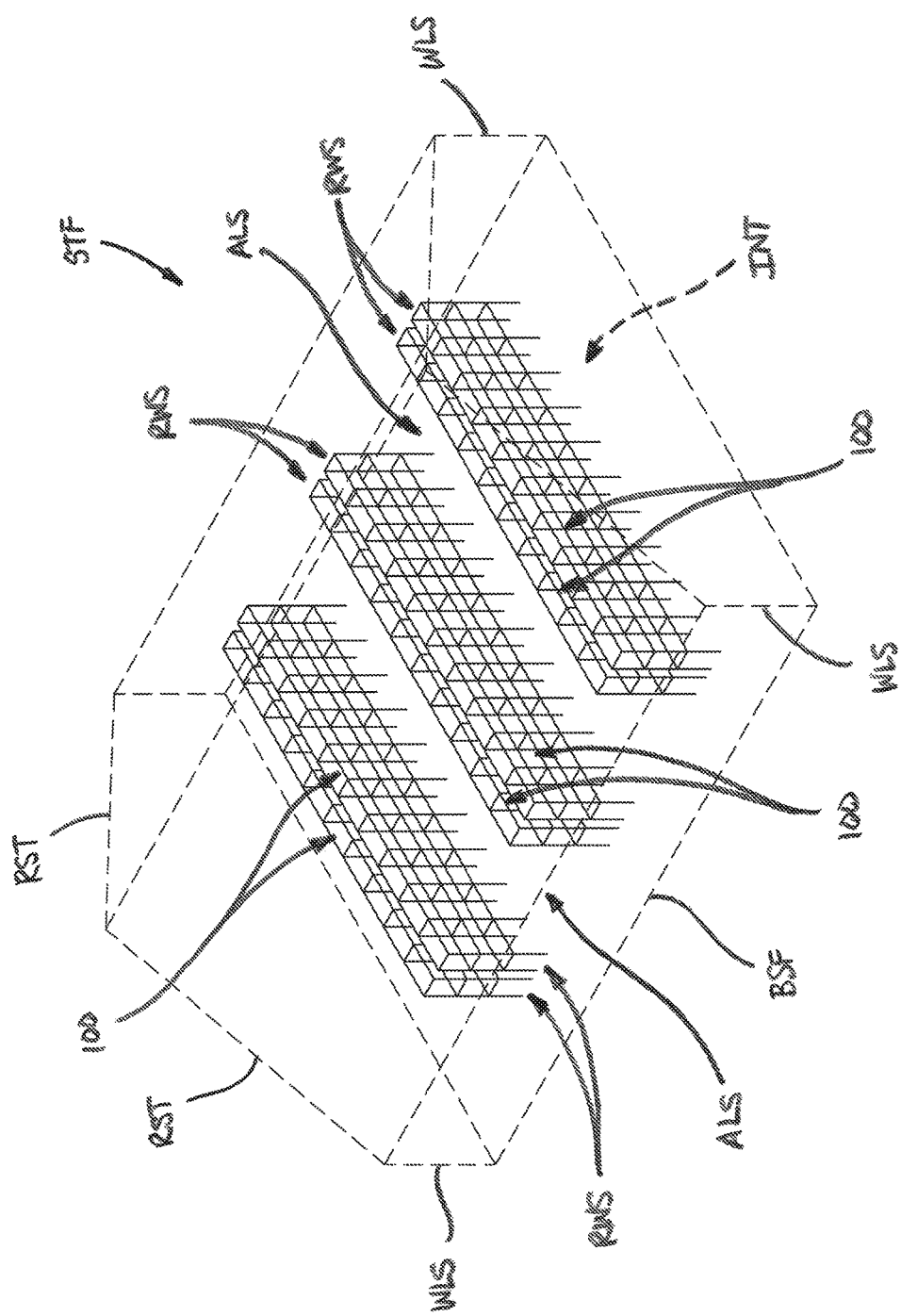
FIG. 1 is schematic representation of a storage facility including multiple rows of storage rack assemblies in accordance with the subject matter of the present disclosure.
Figure 2:
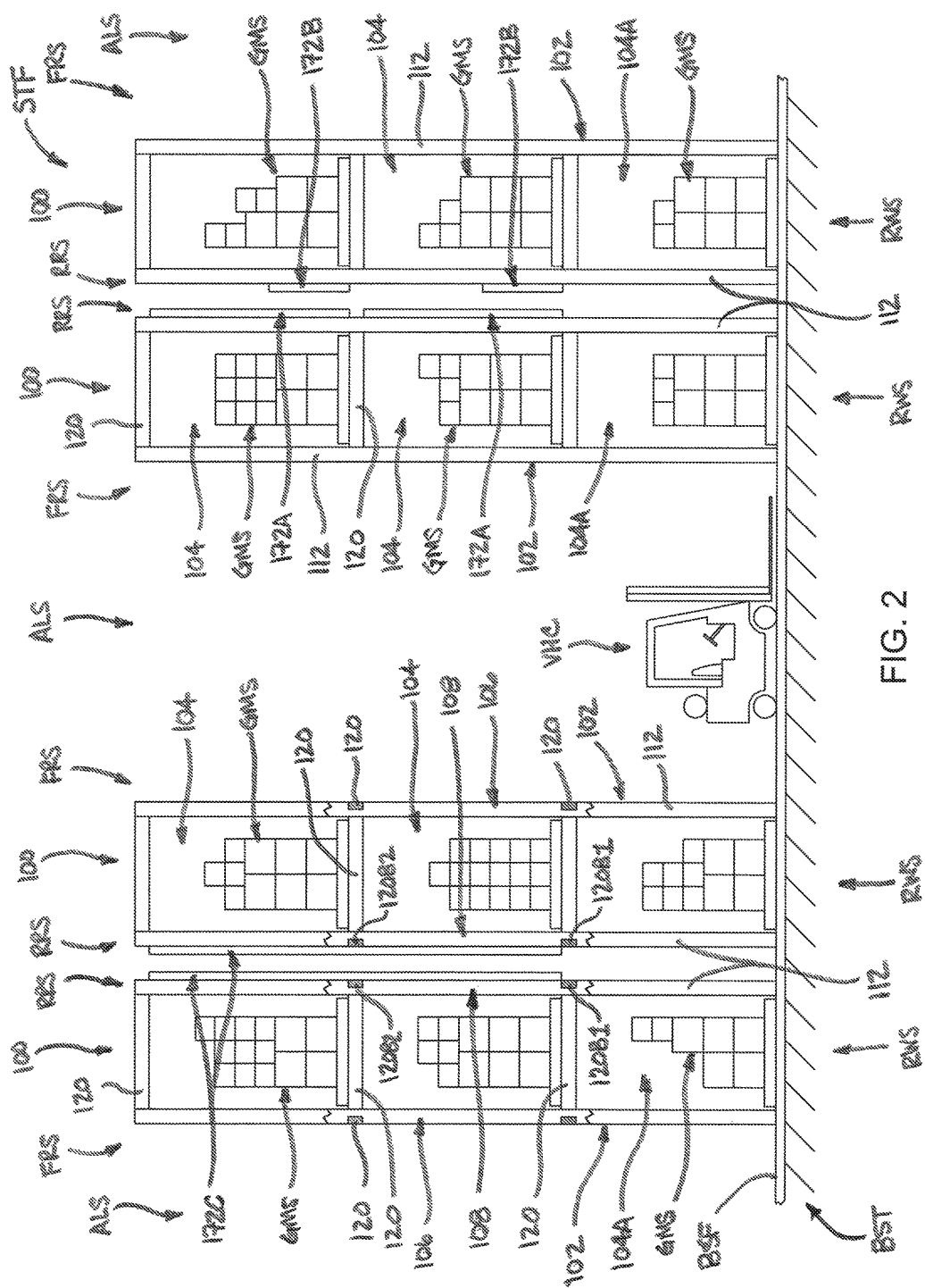
FIG. 2 is a side elevation view of a portion of the storage facility in FIG. 1 with rows of storage rack assemblies separated by an aisle.
Figure 3:
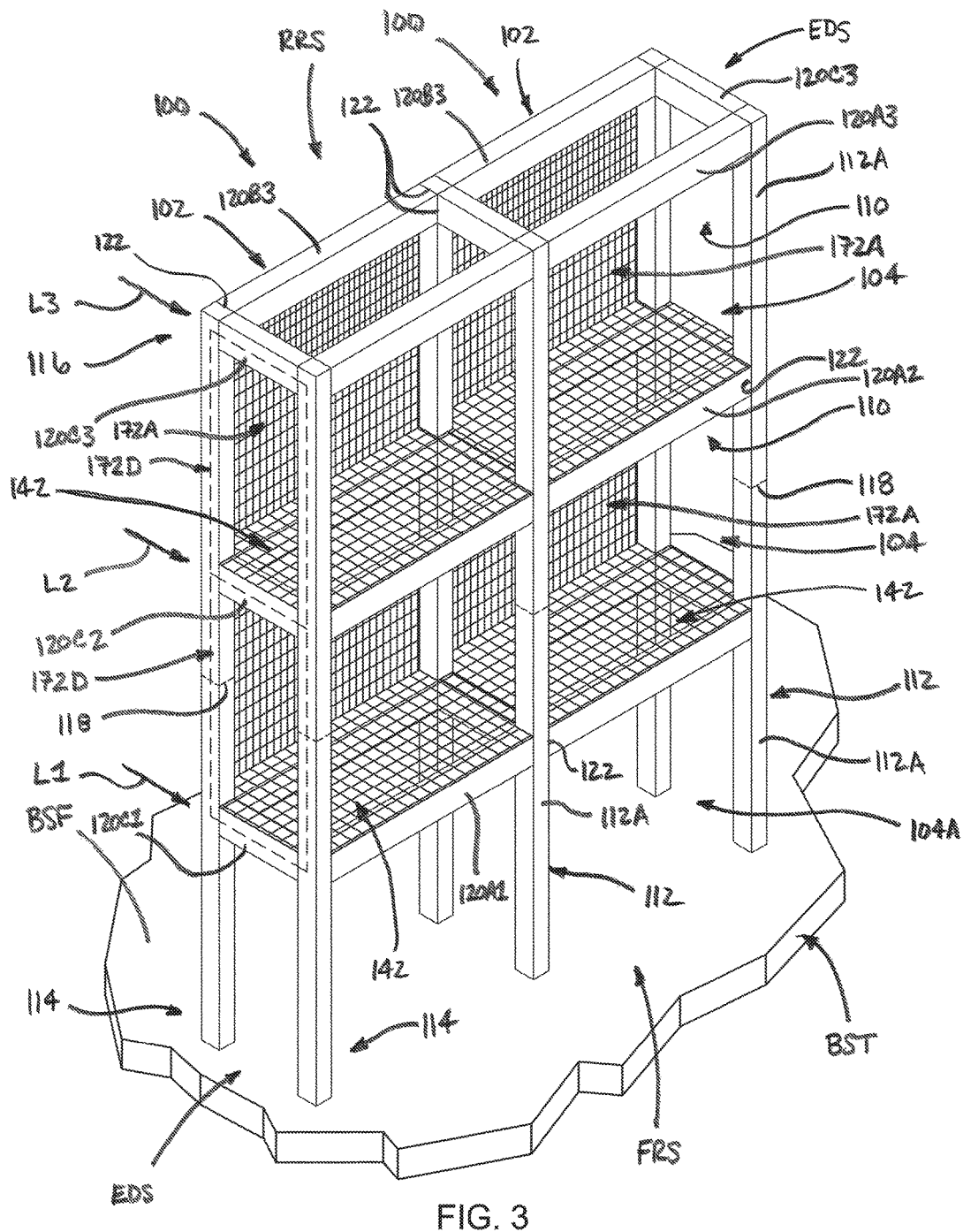
FIG. 3 is a top perspective view of one example of a plurality of storage rack assemblies in accordance with the subject matter of the present disclosure.

FIGS. 1-3 illustrate one example of a storage facility STF for short-term and/or long-term storage of goods and materials of a wide variety of types and kinds. Examples of such storage facilities can include enclosed storage facilities, such as warehouses, distribution centers and retail establishments as well as interior storage areas within or otherwise associated with manufacturing facilities, factories and plants and/or other industrial, commercial and/or retail spaces. Additional examples of storage facilities can include open-air storage facilities, such as covered and uncovered storage yards and/or other exterior areas associated with manufacturing facilities, factories and plants and/or other industrial, commercial and/or retail spaces. As such, it will be appreciated that the subject matter of the present disclosure is not intended to be limited to use in association with storage facilities of any particular type, kind, size and/or arrangement.

Storage facility STF is shown as including a base surface BSF on which one or more storage rack assemblies in accordance with the subject matter of the present disclosure can be supported. It will be appreciated that a base surface of any suitable type, kind and/or construction can be used. In many cases, the base surface will take the form of a prepared surface that is constructed and configured for vehicles to travel along and/or across. In some cases, such vehicles can include vehicles VHC (FIG. 2) constructed to lift and transport goods and materials, such as tow motors, forklifts (or forklift trucks), reach trucks, sideloaders and/or teletrucks, for example. Non-limiting examples of suitable base surfaces can include interior floors, exterior storage yards and other such areas. Base surfaces are commonly formed from a relatively hard and strong base material suitable for creating a relatively smooth and flat surface suitable for supporting one or more storage rack assemblies, the associated goods and materials stored thereon and any vehicles that may be used to transport the associated goods and materials on to, off of and/or otherwise between the storage rack assemblies and other areas. A non-limiting example of a material that may be suitable for use in forming a base surface can include steel-reinforced concrete. It will be appreciated, however, that other materials and/or constructions could alternately be used.

In the arrangement shown in FIGS. 1-3, storage facility STF is represented as taking the form of an interior storage facility that includes a base structure BST that at least partially forms base surface BSF. Storage facility STF can optionally include a roof structure RST that extends across at least a portion of base surface BSF. In some cases, the roof structure can be supported on base structure BST using one or more structural components and/or features, such as one or more columns, posts and/or walls, for example. In the arrangement shown in FIG. 1, for example, a plurality of walls WLS extend between base structure BST and roof structure RST, and at least partially enclose the storage facility to form an interior INT thereof.

A storage facility in accordance with the subject matter of the present disclosure, such as storage facility STF, for example, can include any suitable number of one or more storage rack assemblies. Additionally, it will be appreciated that such one or more storage rack assemblies in accordance with the subject matter of the present disclosure can be positioned, organized or otherwise arranged in any suitable manner relative to one another and/or any associated storage facility features (e.g., walls). In the arrangement shown in FIGS. 1 and 3, for example, a plurality of storage rack assemblies 100 are disposed in a plurality of rows RWS that are spaced apart from one another such that one or more aisles ALS are formed along one of the rows and/or between adjacent ones of a plurality of rows.

As indicated above, storage rack assemblies in accordance with the subject matter of the present disclosure can be positioned, organized or otherwise arranged in any suitable manner relative to one another such that goods and materials can be transferred into and out of, or otherwise onto and off of, the storage rack assemblies. It will be appreciated that storage rack assemblies are commonly arranged such that goods and materials are transferred into and out of, or otherwise onto and off of, the storage rack assemblies from a pre-established direction. As one example, storage rack assemblies 100 are shown as having a front (or front side) FRS and a rear (or rear side) RRS as well as one or more ends (or end sides) EDS. In some cases, storage rack assemblies 100 can be arranged end-to-end relative to one another to form rows RWS with front sides FRS facing a common direction and rear sides RRS facing the opposite direction. Additionally, in some cases, two storage rack assemblies 100 or rows of storage rack assemblies RWS can be arranged back-to-back such that front sides FRS thereof are accessible from along an aisle ALS. It will be appreciated, however, that other configurations and/or arrangements could alternately be used without departing from the subject matter of the present disclosure.

Storage rack assemblies 100 can include a storage rack structure 102 that at least partially defines one or more storage bays 104 disposed at a non-zero height above base surface BSF. In many cases, each storage rack structure 102 will include a base-level storage bay 104A that utilizes base surface BSF as the floor of the storage bay. Typically, each storage bay will include a front opening dimensioned for transferring goods and materials GMS (FIG. 2) into and out of, or otherwise onto and off of, storage rack assemblies 100. Additionally, each storage bay can include at least one of a rear opening and a side opening. In many cases, storage bays 104 will include a front opening 106, a rear opening 108 and at least one side opening 110. It will be appreciated, however, that other configurations, arrangements and/or constructions could alternately be used.

Storage rack structures 102 can be assembled or otherwise formed from any suitable combination of components, elements and/or assemblies. Additionally, it will be appreciated that such components, elements and/or assemblies can be formed from any suitable material or combination of materials. In many cases, various combinations of steel alloys are used. It will be appreciated, however, that other metals (e.g., aluminum) and/or other materials, such as non-metallic composites and/or metal/non-metal composites, could alternately be used.

The storage rack structures can include a plurality of elevational support members and a plurality of cross members that extend between and operatively interconnect two or more of the elevational support members. It will be appreciated that the elevational support members and cross members can be of any suitable type, kind and/or construction. As shown in FIGS. 1-3, for example, the plurality of elevational support members can take the form of columns 112 that extends vertically between a bottom or base end 114 that is supported on base surface BSF and a distal or upper end 116 that is at a non-zero height or distance from base surface BSF. In some cases, the plurality of columns can extend substantially continuously between the base end and the upper end. In other cases, plurality of columns 112 can include a plurality of interconnected column sections 112A that can be operatively connected with one another in a suitable manner. As examples, each column could include two or more sections 112A that are secured to one another by way of a corresponding number of one or more mechanical and/or flowed-material joints, such as are represented in FIG. 3 by dashed lines 118.

Storage rack structures 102 can include any suitable number of two or more of columns or other elevational support members. In some cases, each of storage rack structures 102 can be formed from four columns that include two front columns disposed along front side FRS and two rear columns disposed along rear side RRS. In some constructions, each of storage rack structures 102 can be separately and individually formed from four columns with adjacent storage rack structures also including four separate columns. In other constructions, however, each storage rack structure can be formed from four columns with two columns (e.g., two left columns or two right columns) being common to adjacent storage rack structures, such as is illustrated in FIGS. 1-3, for example.

As indicated above, storage rack structures 102 can include a plurality of cross members that operatively interconnect two or more of the plurality of columns that form the storage rack structures. As shown in FIGS. 1-3, 10-12 and 18-20, the plurality of cross members can take the form of a plurality of rails or beams 120 that can be secured between columns 112 in any suitable manner. As examples, opposing ends of beams 120 can each be secured to a corresponding one of columns 112 by way of a mechanical and/or flowed-material joint, such as are represented in FIG. 3 by lines 122.

Plurality of beams 120 are assembled or otherwise secured onto columns 112 in groups or sets that together can at least partially define one or more of storage bays 104. For example, storage rack structures 102 are shown in FIGS. 1-3 as including a plurality of levels disposed at increasing non-zero heights or distances from base surface BSF. In the arrangement shown, storage rack structures 102 include three discrete levels, which are identified by reference arrows L1, L2 and L3 in FIG. 3. It will be recognized that level L1 can at least partially define the top or upper extent of base-level storage bays 104A as well as a bottom or lower extent of storage bays 104 disposed between levels L1 and L2. Additionally, it will be recognized that level L2 can at least partially define the top or upper extent of storage bays 104 disposed between levels L1 and L2 as well as a bottom or lower extent of storage bays 104 disposed between levels L2 and L3. Furthermore, it will be recognized that level L3 can at least partially define the top or upper extent of storage bays 104 disposed between levels L2 and L3. It will be appreciated, however, that the foregoing description is merely one non-limiting example of a suitable construction and/or arrangement, and that other configurations could be used without departing from the subject matter of the present disclosure.

It will be appreciated that each level can include a plurality of beams 120. For example, the groups or sets of beams 120 that at least partially define each of levels L1-3 can include a corresponding one of front beams 120A1, 120A2 and 120A3 as well as a corresponding one of rear beams 120B1, 120B2 and 120B3. In a preferred arrangement, levels L1-3 can also include a corresponding one or more of side beams 120C1, 120C2 and 120C3. It will be recognized and understood, however, that additional structural features and/or components can also be used without departing from the subject matter of the present disclosure.

It will be appreciated that plurality of beams 120 can be of any suitable size, shape, type, kind, configuration and/or construction. For example, beams 120 could have an approximately rectangular cross-sectional shape, such as is shown in FIGS. 2 and 3. As another example, beams 120 could have a cross-sectional shape that is approximately rectangular with a notch or recess formed along one or more corners thereof, such as is shown in FIGS. 10-12 and 18-20, for example. As such, it will be appreciated that beams 120 can include any suitable combination of walls, wall portions, surfaces, surface portions and/or areas. For example, with further reference to FIGS. 12 and 20, beams 120 can include a beam wall 124 that at least partially defines a hollow interior 126. Beam wall 124 can include a top or upper surface (or surface portion) 128 and a bottom or lower surface (or surface portion) 130 facing opposite upper surface 128. Side surfaces (or surface portions) 132 and 134 can be oriented transverse to the upper and lower surfaces, and can face generally opposite one another. In preferred arrangement, one of the side surfaces will face in an inward direction and the opposing side surface will face in an outward direction. As identified in FIGS. 12 and 20, side surfaces 132 are outward facing and side surfaces 134 are inward facing. In cases in which beams 120 have a cross-sectional shape with notched, recessed or other features, beam walls 124 can, optionally, include a side surface (or surface portion) 136 that is spaced from side surface 134 in a direction toward side surface 132. In such cases, a shoulder surface (or surface portion) 138 can extend between and operatively connect side surfaces 134 and 136 such that a step 140 extends lengthwise along one or more of beams 120.

Storage rack assemblies 100 can also include one or more storage decks 142 that can be supported on or along storage rack structure 120. Storage decks 142 are constructed to function as at least a portion of the floor of the storage bay within which the storage deck is installed. In such case, goods and materials GMS in palletized or unpalletized form can be positioned within storage bays 104 on storage decks 142 for long-term and/or short-term storage. It will be appreciated that storage decks 142 can be of any suitable type, kind, construction and/or configuration. Additionally, it will be appreciated that storage decks 142 can be formed from any suitable materials or combinations of materials, such as metal materials (e.g., steel and/or aluminum) and/or polymeric materials (e.g., high-strength thermoplastic and/or fiber-reinforced thermoplastic materials).

Figure 4:
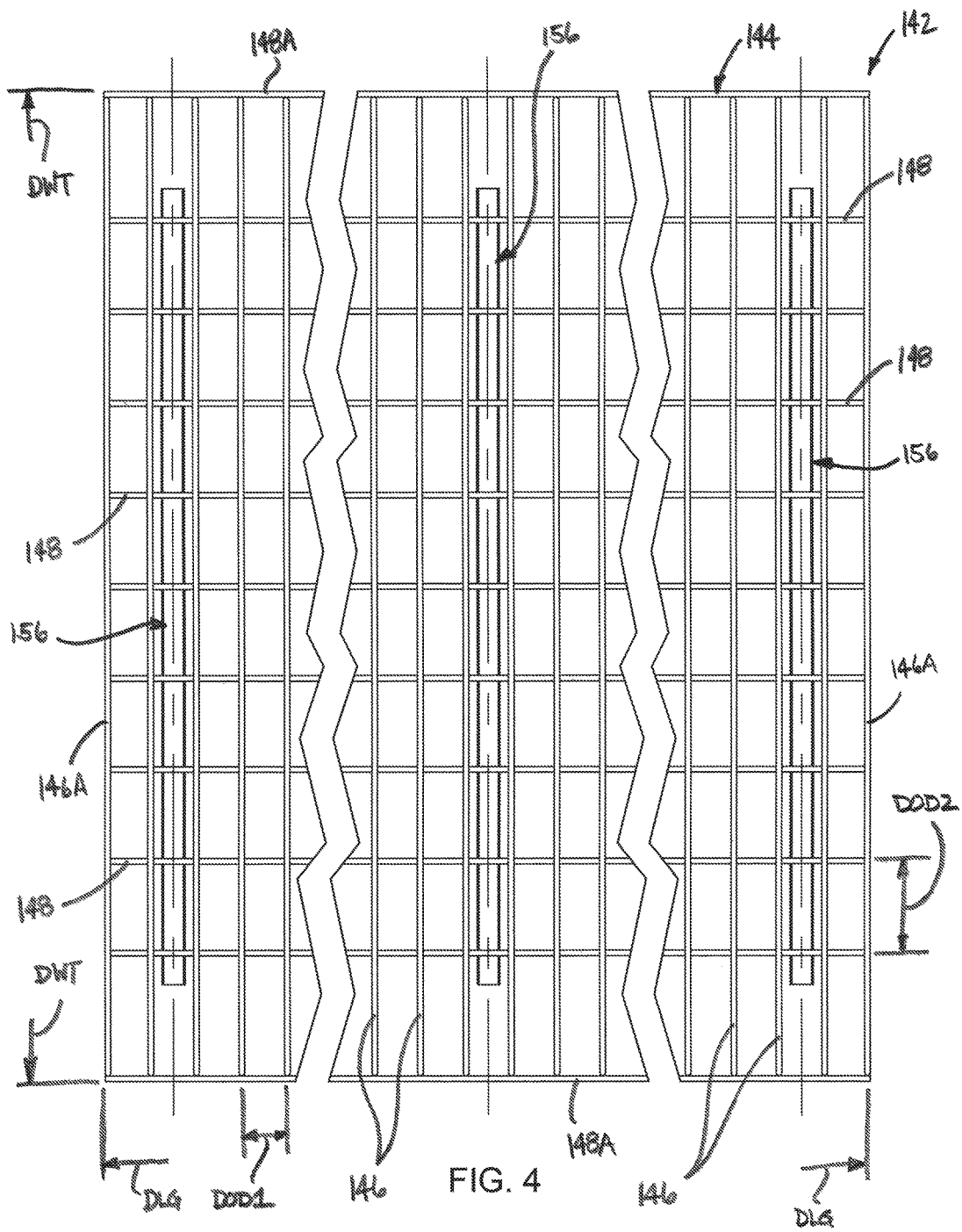
FIG. 4 is a top plan view of one example of a storage deck, such as is shown in FIG. 3.
Figure 5:
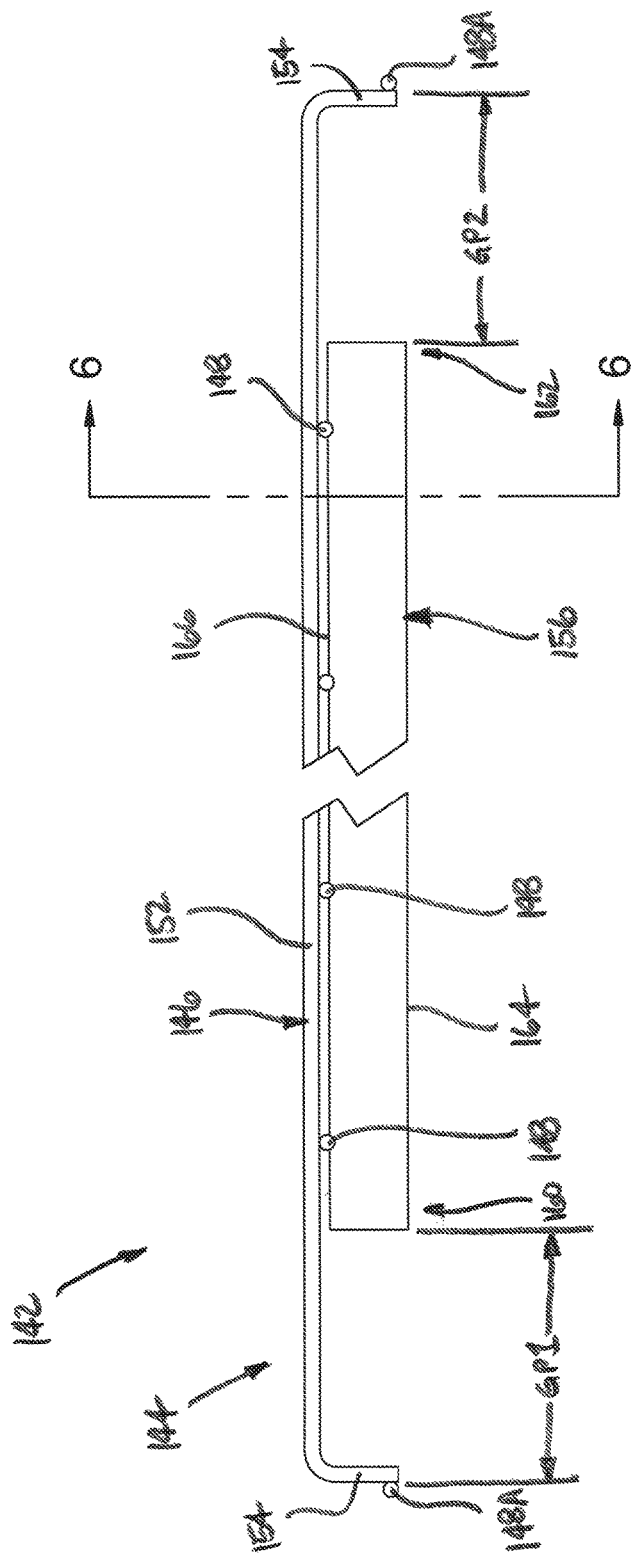
FIG. 5 is a side elevation view of the exemplary storage deck shown in FIGS. 3 and 4.
Figure 6:
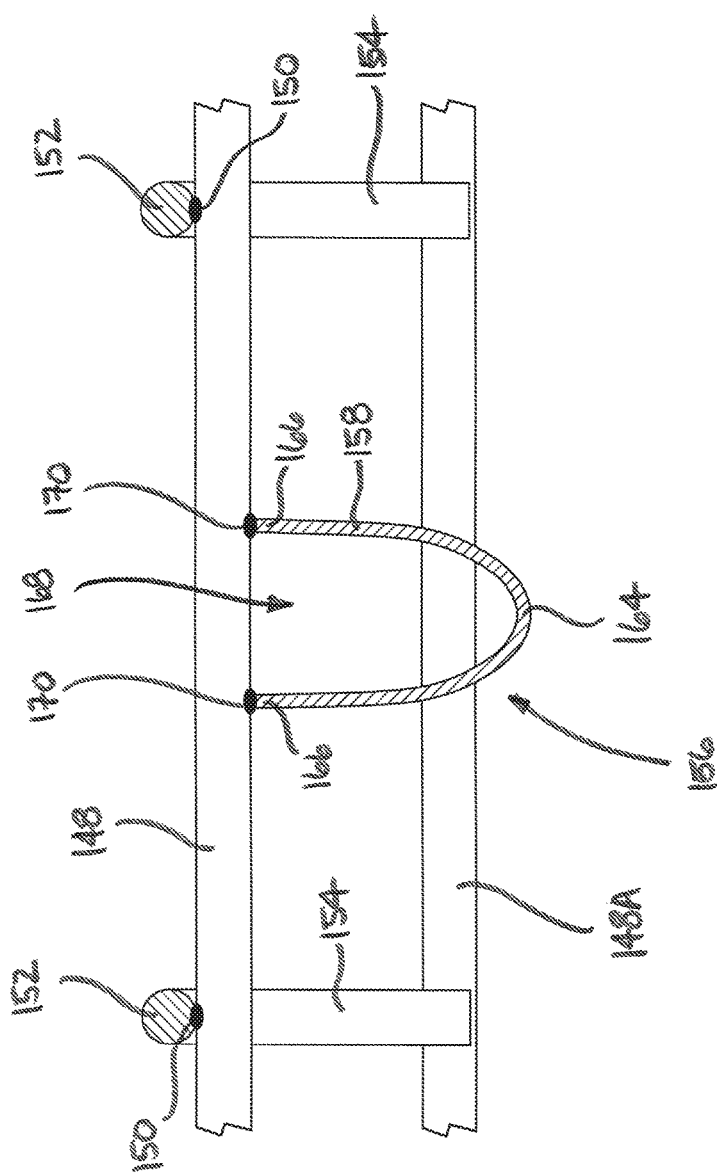
FIG. 6 is a cross-sectional side view of the exemplary storage deck shown in FIGS. 3-5 taken from along line 6-6 in FIG. 5.

One example of a suitable construction for storage decks 142 is shown in FIGS. 4-6 as including a deck sheet 144 that is at least partially formed from a plurality of deck wires, such as may be formed from a metal material (e.g., a steel alloy). In some cases, the plurality of deck wires can be organized into a grid pattern with a first plurality of deck wires 146 disposed in a first orientation and a second plurality of deck wires 148 disposed in a second orientation that is transverse (e.g., approximately perpendicular) to the first orientation of the first plurality of deck wires. First plurality of deck wires 146 can be spaced apart from one another by a first deck offset dimension DOD1 that is approximately uniform between adjacent ones of deck wires 146. Second plurality of deck wires 148 can be spaced apart from one another by a second deck offset dimension DOD2 that is approximately uniform between adjacent ones of deck wires 148. In some cases, the first and second deck offset dimensions can be approximately equal to one another. In other cases, one of the first and second deck offset dimensions can be greater than the other of the first and second deck offset dimensions. In the arrangement shown in FIGS. 4-6, for example, second deck offset dimension DOD2 is greater than first deck offset dimension DOD1. It will be appreciated, however, that other configurations could alternately be used.

The plurality of deck wires can be operatively connected with one another in any suitable manner. As one example, first plurality of deck wires 146 can be supported in abutting engagement along second plurality of deck wires 148, and attached or otherwise secured thereto by way of flowed-material joints 150. In some cases, first plurality of deck wires 146 can include edge wires 146A that are the outermost wires (e.g., first and last of the series wires) of the plurality. Additionally, or in the alternative, second plurality of deck wires 148 can include edge wires 148A that are the outermost wires (e.g., first and last of the series of wires) of the plurality. In such cases, edge wires 146A and 148A can at least partially define an outer periphery of deck sheet 144. As such, it will be appreciated that storage decks 142 can, in some cases, extend between opposing edges that at least partially define a deck length and opposing edges that at least partially define a deck width, such as is represented in FIG. 4 by reference dimensions DLG and DWT, respectively.

In the arrangement shown in FIGS. 4-6, deck wires 146 include deck portions 152 that at least partially define a support surface of storage decks 142 and extension portions 154 that extend transverse to deck portions 152. In some cases, deck wires 148 can be disposed along a first or under side of deck wires 146 along deck portions 152 and inside of extension portions 154. In such cases, edge wires 148A can, optionally, be disposed along a second or opposing side of deck wires 146 that is outside of extension portions 154.

In some cases, one or more additional features and/or elements can be included on or along storage decks 142, such as may provide added strength and/or rigidity to the storage decks, for example. As one example, one or more support channels 156 can be secured on, along or otherwise across the plurality of deck wires of deck sheet 144. In the arrangement shown in FIGS. 4-6, for example, support channels 156 include a channel wall 158 that extends lengthwise between opposing ends 160 and 162. Channel wall 158 of support channels 156 can have an approximately U-shaped cross-sectional configuration with a central wall portion 164 that extends outwardly to channel edges 166 that at least partially define an open end 168 of support channels 156. In a preferred arrangement, channel edges 166 of support channels 156 can be disposed in abutting engagement with deck wires 148 and secured thereto by way of flowed-material joints 170. It will be appreciated, however, that other configurations and/or arrangements could alternately be used. In some cases, support channels 156 can have an overall length (not identified) between ends 160 and 162 that is less than deck width DWT such that gaps can be formed between the ends of the support channels and edge wires 148A and/or extension portions 154 of deck wires 146, as is represented in FIG. 5 by reference dimensions GP1 and GP2. In some cases, support channels 156 can be positioned on or along deck sheet 144 such that gaps GP1 and GP2 are approximately equal in size with one another along ends 160 and 162. In other cases, support channels 156 can be positioned on or along deck sheet 144 such that the gaps are different in size along ends 160 and 162.

Storage rack assemblies can also include one or more barrier panel assemblies in accordance with the subject matter of the present disclosure that are supported on or along the storage rack structure and extend across at least a portion of one of the storage bays thereof. Additionally, the one or more barrier panel assemblies are preferably captured between the storage rack structure and one of the storage decks to thereby secure or otherwise retain the one or more barrier panel assemblies on or along the storage rack structure. It will be appreciated that, in a preferred arrangement, the one or more barrier panel assemblies can be captured, secured or otherwise retained on the storage rack structure without the use of fasteners, flowed-material joints or other securement devices and/or features extending between or otherwise operatively connecting the barrier panel assemblies (or components thereof) to the storage rack structure (or components thereof).

Stated differently, in a preferred arrangement, one or more components of the barrier panel assembly can be supported in abutting engagement along one or more components of the storage rack structure. Additionally, in a preferred arrangement, the storage deck can be supported on or along one or more components of the storage rack structure. In such cases, the storage deck can extend over or otherwise overlap the one or more components of the barrier panel assembly that are supported in abutting engagement on or along the one or more component of the storage rack structure and thereby prevent or at least substantially inhibit the removal or other inadvertent disassociation of the barrier panel assembly from the storage rack structure. It will be appreciated that a barrier panel assembly in accordance with the subject matter of the present disclosure can extend across or otherwise at least partially cover at least a portion of one or more of the openings of one or more storage bays 104.

As one example, barrier panel assemblies 172A are shown in FIGS. 2 and 3 extending across a substantial portion of rear openings 108 of storage bays 104 in both the vertical and horizontal directions. As another example, barrier panel assemblies 172B are shown in FIG. 2 as extending across a substantial portion of rear openings 108 in the horizontal direction while extending only partially across the rear openings in the vertical direction. As a further example, barrier panel assemblies 172C are shown in FIG. 2 as extending vertically between two storage bays 104. In such cases, barrier panel assemblies 172C can be dimensioned such that the barrier panel assemblies extend horizontally across approximately one-half of each of the two storage bays such that two of barrier panel assemblies 172C can be installed side-by-side to substantially-entirely cover the rear openings of both storage bays. As a further example, one or more barrier panel assemblies can extend across or otherwise at least partially cover at least a portion of one or more of side openings 110 of storage bays 104, such as are represented in FIG. 3 by dashed lines 172D.

With reference, now, to FIGS. 7-12, one example of a barrier panel assembly 172 in accordance with the subject matter of the present disclosure is shown that is suitable for installation and use as one or more of barrier panel assemblies 172A, 172B, 172C and/or 172D, for example. Barrier panel assemblies 172 can include a barrier sheet 174 dimensioned to extend across at least a portion of one or more of the openings of storage bays 104, such as has been described above, for example. Barrier sheets 174 can be at least partially formed from a plurality of barrier wires, such as may be formed from a metal material (e.g., a steel alloy). In some cases, the plurality of barrier wires can be organized into a grid pattern with a first plurality of barrier wires 176 disposed in a first orientation and a second plurality of barrier wires 178 disposed in a second orientation that is transverse (e.g., approximately perpendicular) to the first orientation of the first plurality of barrier wires.

First plurality of barrier wires 176 can be spaced apart from one another by a first barrier offset dimension BOD1 that is approximately uniform between adjacent ones of barrier wires 176. Second plurality of barrier wires 178 can be spaced apart from one another by a second barrier offset dimension BOD2 that is approximately uniform between adjacent ones of barrier wires 178. In some cases, the first and second barrier offset dimensions can be approximately equal to one another. In other cases, one of the first and second barrier offset dimensions can be greater than the other of the first and second barrier offset dimensions. In the arrangement shown in FIGS. 7-12, for example, second barrier offset dimension BOD2 is greater than first barrier offset dimension BOD1. It will be appreciated, however, that other configurations could alternately be used.

Figure 7:
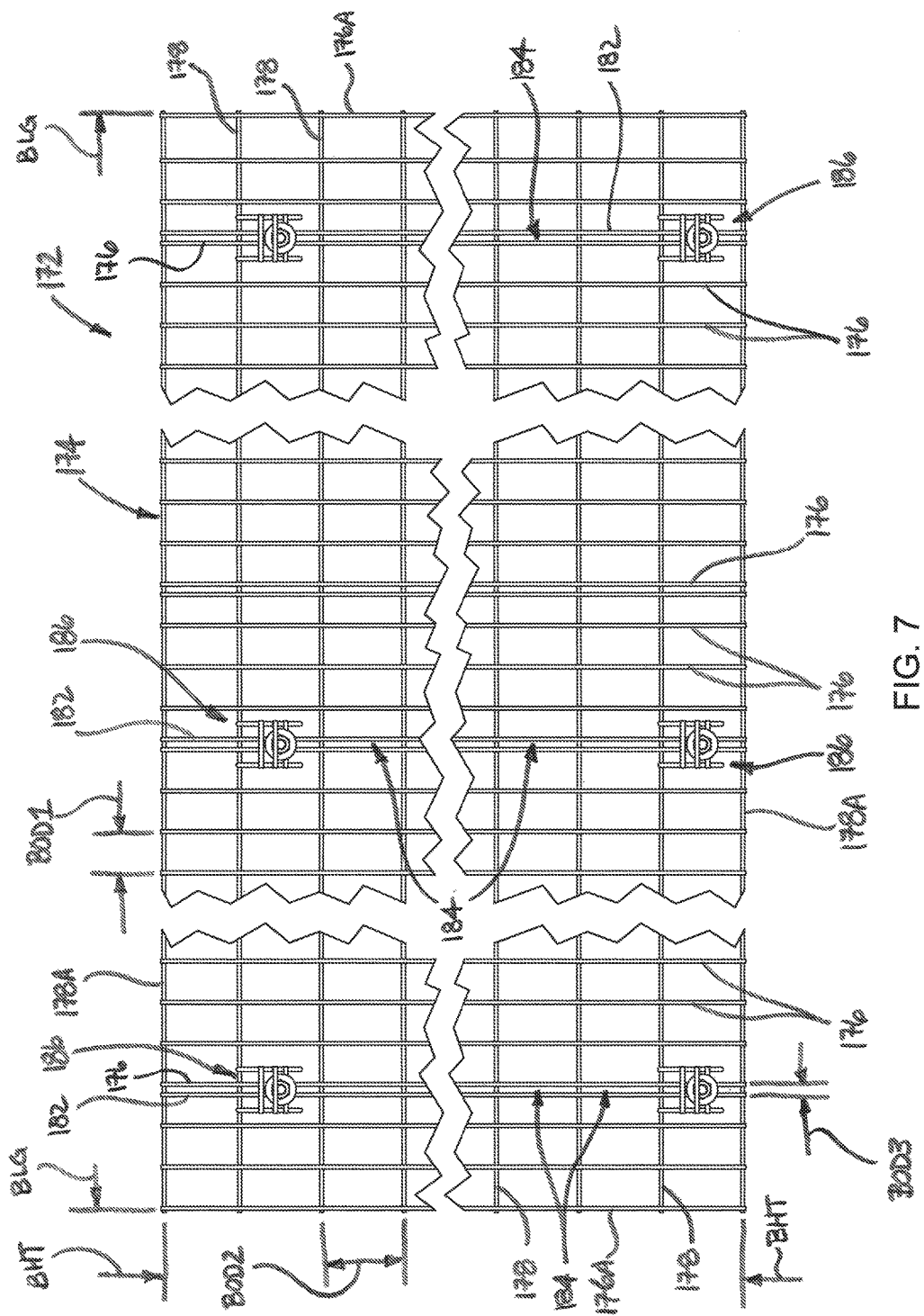
FIG. 7 is a front plan view of one example of a barrier panel assembly in accordance with the subject matter of the present disclosure, such as is shown in FIG. 3.
Figure 8:
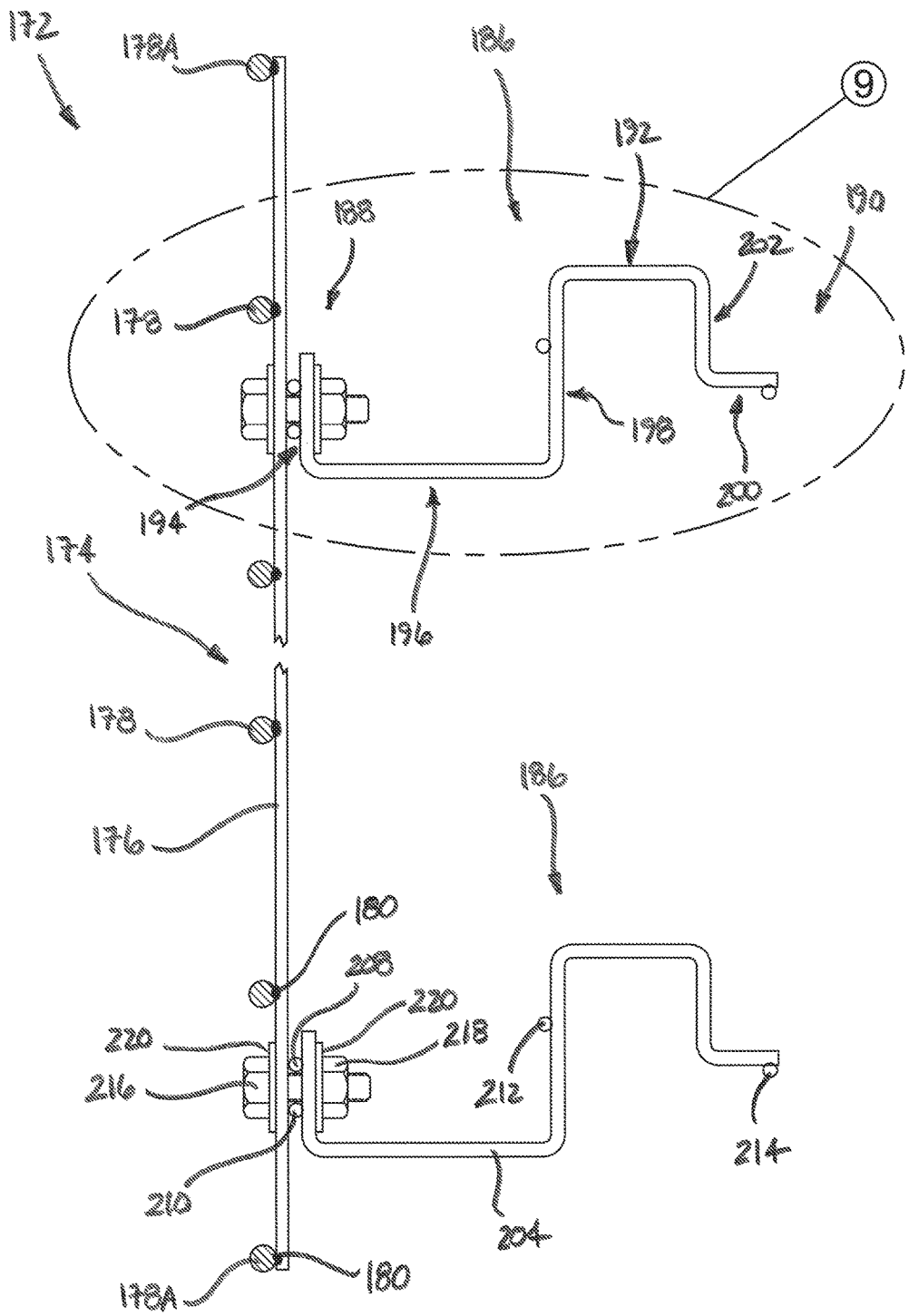
FIG. 8 is a side elevation view of the barrier panel assembly in FIGS. 3 and 7.
Figure 9:
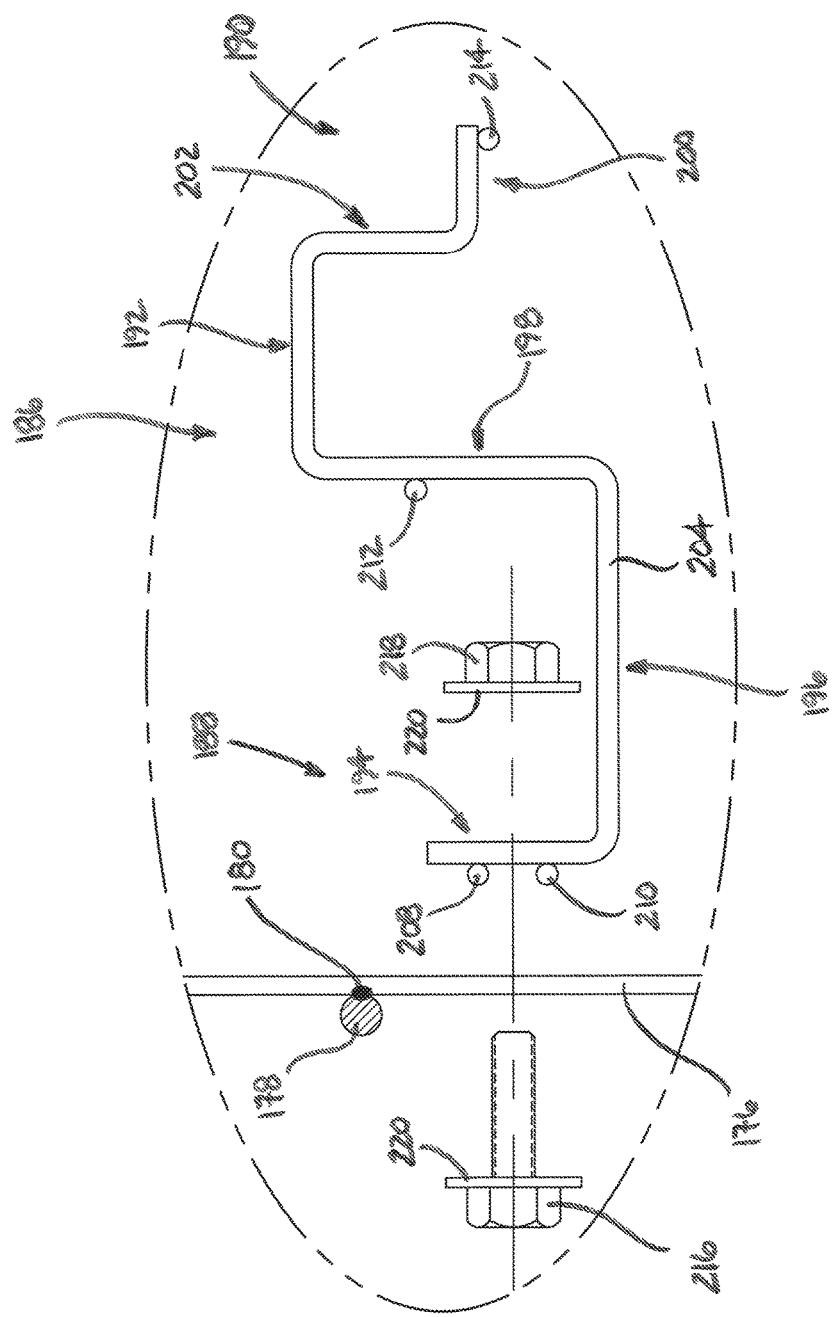
FIG. 9 is an exploded view of an enlarged portion of the barrier panel assembly in FIGS. 3, 7 and 8 as identified in Detail 9 of FIG. 8.

The plurality of barrier wires can be operatively connected with one another in any suitable manner. As one example, first plurality of barrier wires 176 can be supported in abutting engagement along second plurality of barrier wires 178, and attached or otherwise secured thereto by way of flowed-material joints 180. In some cases, first plurality of barrier wires 176 can include edge wires 176A that are the outermost wires (e.g., first and last of the series wires) of the plurality. Additionally, or in the alternative, second plurality of barrier wires 178 can include edge wires 178A that are the outermost wires (e.g., first and last of the series of wires) of the plurality. In such cases, edge wires 176A and 178A can at least partially define an outer periphery of barrier sheet 174. As such, it will be appreciated that barrier panel assemblies 172 can, in some cases, extend between opposing edges that at least partially define a barrier length and opposing edges that at least partially define a barrier height, such as is represented in FIG. 7 by reference dimensions BLG and BHT, respectively.

In some cases, the plurality of barrier wires can also, optionally, include a third plurality of barrier wires 182 arranged in the first orientation, which is transverse (e.g., approximately perpendicular) to barrier wires 178. As such, barrier wires 182 are oriented or otherwise extend in approximate alignment with barrier wires 176. In a preferred arrangement, barrier wires 182 are offset from barrier wires 176 by a third barrier offset dimension BOD3 that is less than the first and second barrier offset dimensions. Barrier offset BOD3 and can, in some cases, at least partially define gaps or openings 184 between one of barrier wires 176 and an adjacent one of barrier wires 182. In such cases, openings 184 can be dimensioned to receive fasteners or other securement devices, such as is described hereinafter, for example.

Barrier panel assemblies in accordance with the subject matter of the present disclosure, such as barrier panel assemblies 172, for example, can also include one or more support brackets that are secured or otherwise operatively connected to barrier sheet 174. In some cases, the one or more support brackets can be permanently attached (i.e., inseparable without damage, destruction or material alteration of at least one of the component parts) to the barrier sheet. In other cases, the one or more support brackets can be removably secured to the barrier sheet, such as by way of one or more securement devices, for example. In many cases, a plurality of support brackets can be included.

Additionally, the one or more support brackets can be dimensioned to support the barrier panel assemblies on or along a storage rack structure (e.g., storage rack structure 102) such that the barrier panel assemblies can extend across or otherwise at least partially cover at least a portion of one or more of the openings (e.g., openings 108 and 110) of one or more storage bays (e.g., storage bays 104). The one or more support brackets can be dimensioned or otherwise configured to support the barrier panel assemblies on the storage rack structure in a manner suitable for limiting movement in at least one of a vertical direction (e.g., downward) and a lateral direction (e.g., inward toward the interior of a storage bay and/or outward away from the interior of a storage bay) that is transverse to the vertical direction. In a preferred arrangement, the barrier panel assemblies can be supported on or along the storage rack structure such that, in an installed condition, movement of the barrier panel assemblies is inhibited or otherwise substantially limited in a vertically downward direction and in at least a laterally-outward direction. In a more preferred construction, the barrier panel assemblies are supported on or along the storage rack structure such that, in an installed condition, movement of the barrier panel assemblies is also limited in a laterally-inward direction.

Further to the description provided above, it will be appreciated that barrier panel assemblies in accordance with the subject matter of the present disclosure can be captured, secured or otherwise retained on the storage rack structure without the use of fasteners, flowed-material joints or other securement devices and/or features extending between or otherwise operatively connecting the barrier panel assemblies (or components thereof) to the storage rack structure (or components thereof). In particular, a preferred arrangement will include a plurality of support brackets that are hung on, supported along and/or otherwise engaged with one or more beams (e.g., beams 120) of the storage rack structure (e.g., storage rack structure 102). In such cases, a storage deck (e.g., 142) can extend outwardly over, at least partially cover and/or otherwise at least partially engage one or more of the support brackets. In this manner, one or more of the support brackets can be captured between the storage deck and one or more of the plurality of beams. Such an arrangement will inhibit or otherwise substantially limit movement of the barrier panel assembly in a vertically upward direction. Such an arrangement will also function to maintain the one or more support brackets in an engaged condition with the storage rack structure, and will thereby limit movement of the barrier panel assembly relative to the storage rack structure in one or more other directions, such as has been described above.

It will be appreciated that the one or more support brackets can be configured and/or constructed in any suitable manner and from any suitable combination of components and/or elements. Additionally, it will be appreciated that the one or more support brackets can include, as non-limiting examples, any suitable combination of walls, wall portions, surfaces, surface portions, sections and/or areas. For example, the one or more support brackets can include a section dimensioned to be positioned on, along and/or to abuttingly engage at least one of a top surface (e.g., top surface 128) and a shoulder surface (e.g., shoulder surface 138) of an associated beam (e.g., one of beams 120) or other component and/or feature of the associated storage rack structure (e.g., storage rack structure 102). Additionally, or in the alternative, the one or more support brackets can include a section dimensioned to be positioned on, along, adjacent to and/or to abuttingly engage at least one side surface (e.g., one or more of side surfaces 132 and/or 134) of an associated beam (e.g., one of beams 120) or other component and/or feature of the associated storage rack structure (e.g., storage rack structure 102). In a preferred arrangement, one or more support brackets can include two sections with one section dimensioned to be positioned on, along, adjacent to and/or to abuttingly engage a different one of the side surfaces (e.g., different ones of each of side surfaces 132 and 134) of an associated beam. Furthermore, or as a another alternative, the one or more support brackets can include a section dimensioned for overlapping or other interfering-engagement with an associated storage deck (e.g., storage deck 142) and/or one or more features and/or components thereof (e.g., edge wires 148A, deck portions 152, extension portions 154 and/or support channels 156). Further still, the one or more support brackets can include a section dimensioned to be attached, secured and/or otherwise operatively connected to, on or along an associated barrier sheet (e.g., barrier sheet 174).

Figure 14:
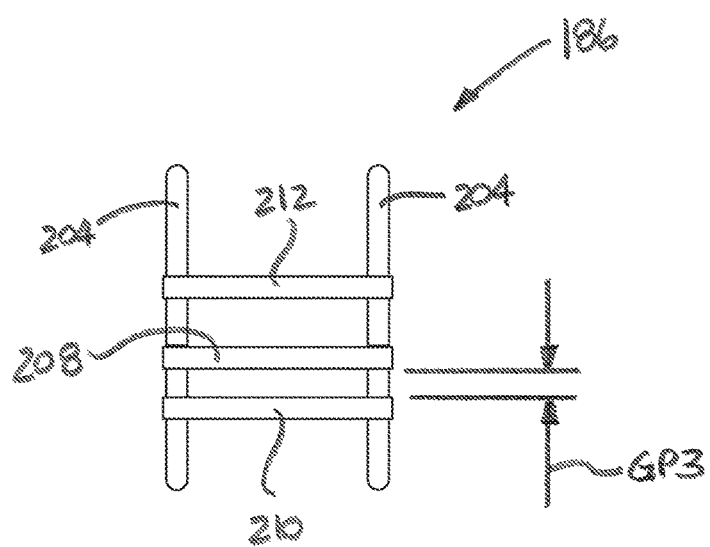
FIG. 14 is a rear elevation view of the mounting bracket in FIGS. 7-13.
Figure 15:
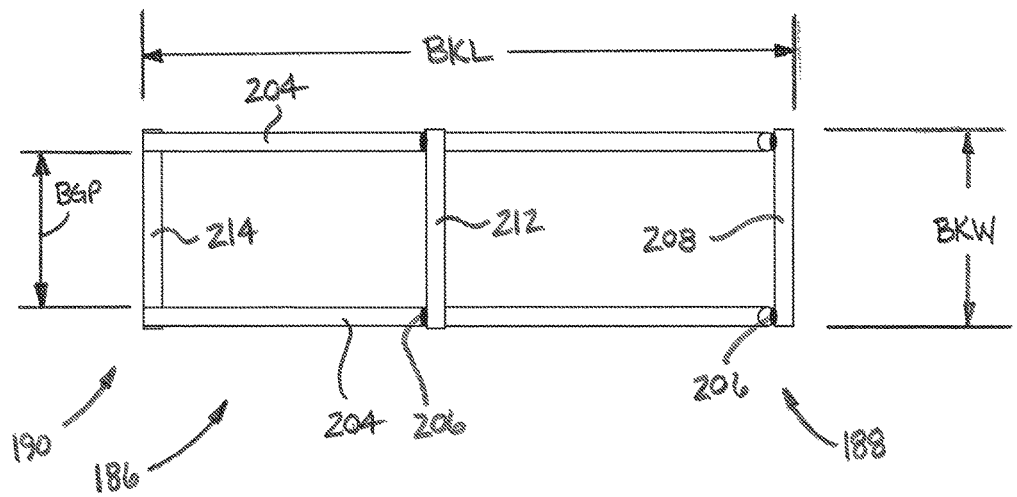
FIG. 15 is a top plan view of the mounting bracket in FIGS. 7-14.
Figure 16:
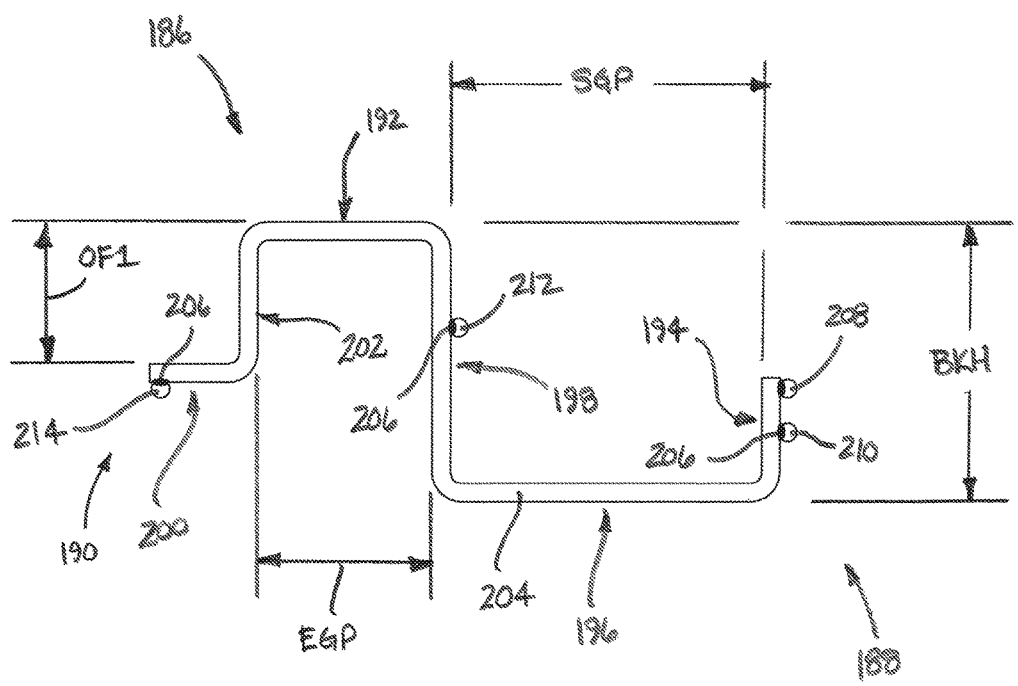
FIG. 16 is a side elevation view of the mounting bracket in FIGS. 7-15.
Figure 17:
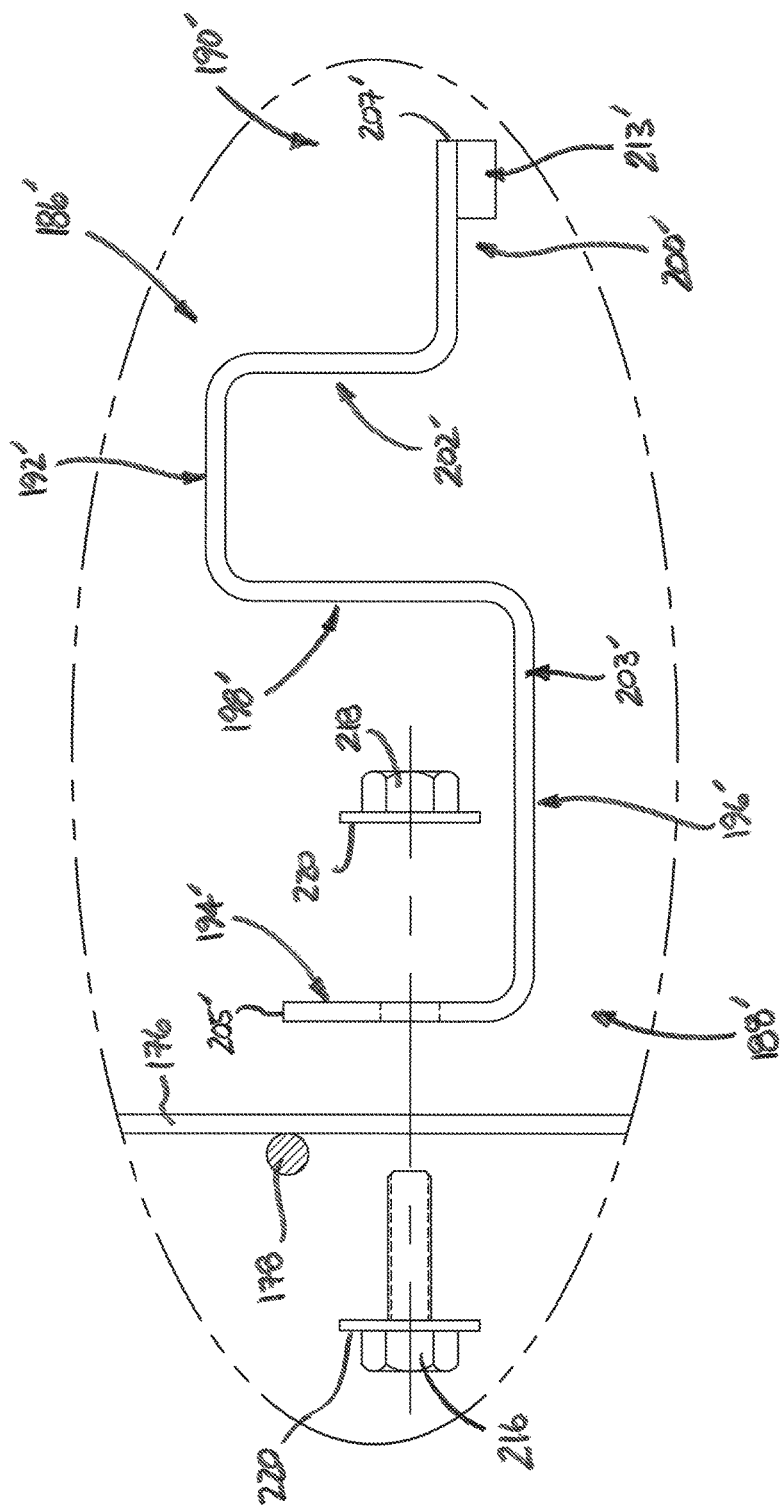
FIG. 17 is an exploded view of an enlarged portion of another example of a barrier panel assembly in accordance with the subject matter of the present disclosure.

As one example, support brackets 186 are shown in FIGS. 7-16 extending in a lengthwise direction between a proximal end 188 and a distal end 190. In a preferred arrangement, support brackets 186 can be oriented relative to barrier sheet 174 such that proximal end 188 is disposed toward barrier sheet 174 and distal end 190 extends away from the barrier sheet relative to proximal end 188. Support brackets 186 can have a bracket length extending between proximal and distal ends 188 and 190, as is represented in FIG. 15 by reference dimension BKL. Support brackets 186 can also have a bracket width and a height, such as are represented in FIGS. 15 and 16 by reference dimensions BKW and BKH. In some cases, support brackets having different length, width and/or height dimensions from bracket-to-bracket can be used. In other cases, a plurality of brackets having at least approximately common length, width and/or height dimensions could be used. In a preferred arrangement, however, support brackets 186 can have a bracket width that is greater than barrier offset dimension BOD3 between barrier wires 176 and 182.

In the exemplary arrangement shown in FIGS. 7-16, support brackets 186 can include an engagement section 192 disposed between proximal end 188 and distal end 190. Engagement section 192 can extend in a generally lengthwise direction and can be dimensioned to abuttingly engage top surface 128 of one of beams 120. Support brackets 186 can also include a securement section 194 disposed along proximal end 188 and oriented transverse to engagement section 192. Securement section 194 is preferably dimensioned for securement on or along barrier sheet 174 in a suitable manner, such as by way of a flowed-material joint and/or one or more fasteners, for example. Support brackets 186 can further include an extension section 196 that can extend in approximate alignment with engagement section 192 though offset therefrom in a heightwise direction, such as is represented in FIG. 16 by bracket height BKH. Extension section 196 can extend from along securement section 194 toward distal end 190.

Support brackets 186 can also include an offset section 198 that extends between and operatively connects engagement section 192 and extension section 196 in offset relation to one another in the heightwise direction. In a preferred arrangement, offset section operatively connects engagement section 192 and extension section 196 such that a securement gap or space is formed in the lengthwise direction between securement section 194 and offset section 198, such as is represented in FIG. 16 by reference dimension SGP, for example. In some cases, support brackets 186 can include a projection section 200 that can be disposed along distal end 190 and oriented in approximate alignment with one or more of engagement section 192 and/or extension section 196. If included, projection section 200 can be positioned in offset relation to at least engagement section 192 and, optionally, in offset relation to extension section 196. In such case, projection section 200 can be offset from engagement section 192 by an offset distance OF1 that is less than bracket height BKH. In a preferred arrangement, projection section 200 can be positioned in the heightwise direction between the engagement and extension sections. Additionally, in some cases, support brackets 186 can include an offset section 202 that can extend between and operatively connect engagement section 192 and projection section 200 in offset relation to one another in the heightwise direction. Offset sections 198 and 202 can be offset or otherwise spaced a distance from one another in the lengthwise direction such that an engagement gap EGP is formed therebetween. In a preferred arrangement, engagement gap EGP is dimensioned to receive at least a portion of one of beams 120 therebetween. In such cases, one of side surfaces 132, 134 and 136 can be disposed along or otherwise adjacent a corresponding one of offset sections 198 and 202.

As indicated above, it will be appreciated that support brackets 186 can be formed from any suitable material or combination of materials, and from any combination of one or more component parts. As one example, support brackets 186 as well as the sections and features thereof can be formed from any combination of one or more rigid wires and/or rod elements and/or any portions thereof, such as shown in FIGS. 7-16. Support brackets 186 can include bracket wires or rods (or, wire or rod portions) 204 that extend lengthwise between proximal and distal ends 188 and 190. In some cases, the bracket rods can be formed from two portions of a common length of wire or rod material. In other cases, bracket rods 204 can be formed from two different segments of wire or rod material. In either case, bracket rods 204 are disposed in spaced relation to one another in a widthwise direction such that an interior opening or gap is formed therebetween, such as is represented in FIG. 15 by reference dimension BGP.

In such a construction, bracket rods 204 are bent or otherwise formed into an approximately common shape such that the bracket rods can together form one or more of sections 192-202 of support brackets 186. Support brackets 186 can also include one or more connector wires or rods that extend between and operatively connect bracket rods 204 to one another in a suitable manner, such as by way of one or more flowed-material joints 206, for example. It will be appreciated that any suitable number and/or arrangement of connector rods can be used. For example, support brackets 186 can include connector rods 208 and 210 operatively connecting bracket rods 204 to one another along securement section 194. In a preferred arrangement, connector rods 208 and 210 can be oriented transverse to bracket rods 204 and in approximate alignment with one another. Additionally, connector rods 208 and 210 can be spaced apart from one another in the heightwise direction such that an opening or gap is formed therebetween, as is represented in FIG. 14 by reference dimension GP3 Further still, in such a preferred arrangement, connector rods 208 and 210 can be disposed outwardly of the portions of bracket rods 204 that at least partially form securement section 194. In this manner, connector rods 208 and 210 can form an outermost element along proximal end 188.

As another example, support brackets 186 can include a connector rod 212 operatively connecting bracket rods 204 to one another along offset section 198. In a preferred arrangement, connector rod 212 can be disposed toward proximal end 188 with respect to the portion of bracket rods 204 that form offset section 198. In such case connector rod 212 can be at least partially disposed within securement gap GP3. As a further example, support brackets 186 can include a connector rod 214 operatively connecting bracket rods 204 to one another along projection section 200. In a preferred arrangement, connector rod 214 can be disposed along the bottom of the portion of bracket rods 204 that at least partially form projection section 200. In such case, connector rod 214 is positioned in the heightwise direction generally toward extension section 196 and away from engagement section 192 with respect to the portion of bracket rods 204 that at least partially form projection section 200.

Another example of support brackets that are suitable for use in forming a barrier panel assembly 172' in accordance with the subject matter of the present disclosure are shown in FIGS. 17-24 as support brackets 186'. As described above in connection with support brackets 186, plurality of support brackets 186' can extend between a proximal end 188' and a distal end 190'. Additionally, support brackets 186' can include an engagement section 192', a securement section 194', an extension section 196', an offset section 198' as well as a projection section 200' and an offset section 202'. It will be appreciated that support brackets 186' can function in a manner substantially similar to that shown and described above in connection with support brackets 186. As such, for purposes of brevity, a detailed description of support brackets 186' is not repeated here. It is to be recognized and understood, however, that the foregoing description of support brackets 186, including all of the features and functions thereof as well as any components that associated therewith, is equally applicable to support brackets 186' as if recited in full detail herein.

Support brackets 186' differ from support brackets 186 in that support brackets 186' are at least partially formed from thin-walled metal material, such as sheet or bar stock, for example, rather than as an assembly of rigid wires and/or rod elements, as is the case with support brackets 186. It will be appreciated that support brackets 186' can include any suitable number of one or more walls and/or wall portions. In a preferred arrangement, however, support brackets 186' can be formed from single pieces of thin-walled metal material. In such cases, support brackets 186' can include a bracket wall 203' that includes a proximal edge 205' disposed along proximal end 188' and a distal edge 207' disposed along distal end 190'. Additionally, bracket wall 203' can extend in a widthwise direction between side edges 209' and 211'. A securement opening or slot GP3' can extend through bracket wall 203' along securement section 194', and can be dimensioned to receive an associated securement device. A recess wall portion 213' can be included along projection section 200' that is offset in a heightwise direction to at least partially form a recess 213A' dimensioned to receive at least a portion of an end (e.g., one of ends 160 and 162) of support channel 156. In some cases, an opening 215' can extend through one or more of projection section 200' and offset section 202' of bracket wall 203' adjacent recess wall portion 213'.

Support brackets 186 and/or 186' can be positioned on or along barrier sheet 174 in any suitable configuration and/or arrangement. In a preferred arrangement, one or more of the support brackets can be positioned adjacent but in inwardly-spaced relation to the outer periphery of barrier sheet 174, such as may be established by edge wires 176A and 178A, for example. Additionally, in a preferred arrangement, support brackets 186 and/or 186' can be disposed on or along a combined set of barrier wires 176 and 182 that have gap 184 formed therebetween. In some cases, support brackets 186 can be oriented relative to barrier sheet 174 such that connector rods 208 and 210 are disposed transverse to barrier wires 176 and 182. In other cases, support brackets 186' can be arranged in other orientations. In a preferred arrangement, support brackets 186 and/or 186' can be arranged in a common orientation relative to one another on or along a given barrier sheet. Regardless of the orientation, in a preferred arrangement, gaps 186 and GP3 or GP3' can form a passage through the support brackets and the barrier sheet that is dimensioned to receive suitable securement devices for securing support brackets 186 and/or 186' on or along barrier sheet 174. It will be appreciated that any suitable combination of one or more securement devices could be used, such as a threaded fastener 216, a threaded nut 218 and one or more washers 220, for example. It will be appreciated, however, that other configurations and/or arrangements could alternately be used.

In assembling a storage rack assembly in accordance with the subject matter of the present disclosure (e.g., storage rack assembly 100), one or more of plurality of support brackets 186 and/or 186' can be operatively engaged with one or more of the plurality of cross members that operatively interconnect two or more of the plurality of columns that form the associated storage rack structure (e.g., storage rack structure 102). As represented by arrow AR1 in FIGS. 12 and 20, for example, barrier panel assemblies 172 and/or 172' can be displaced vertically downward such that engagement section 192/192' is disposed on or along top surface 128 and/or projection section 200/200' is disposed one or along shoulder surface 138. Additionally, in such case, one or more of offset section 198/198' can be disposed along side surface 132 and/or offset section 202/202' can be disposed on or along side surface 134 or 136. In this manner, barrier panel assemblies 172 and/or 172' can be vertically supported on or along beams 120 of storage rack structure 102.

One desired feature of the subject matter of the present disclosure is to provide a construction in which barrier panel assemblies 172 and/or 172' can be secured on or along one or more beams 120 of storage rack structure 102 without the use of fasteners extending between and operatively attaching the barrier panel assemblies to the beams or columns of the storage rack structure. One manner in which such a construction can be achieved includes installing one of storage decks 142 on or along storage rack structure 102 with the storage deck abuttingly engaging a suitable combination of two or more of the front beam, rear beam and side beams of a given storage bay. In installing one of storage decks 142 in such a manner, at least a portion of the storage deck can extend over and capture at least a portion of barrier panel assemblies 172 and/or 172' between the storage deck and an associated one of beams 120 of storage rack structure 102.

Figure 10:
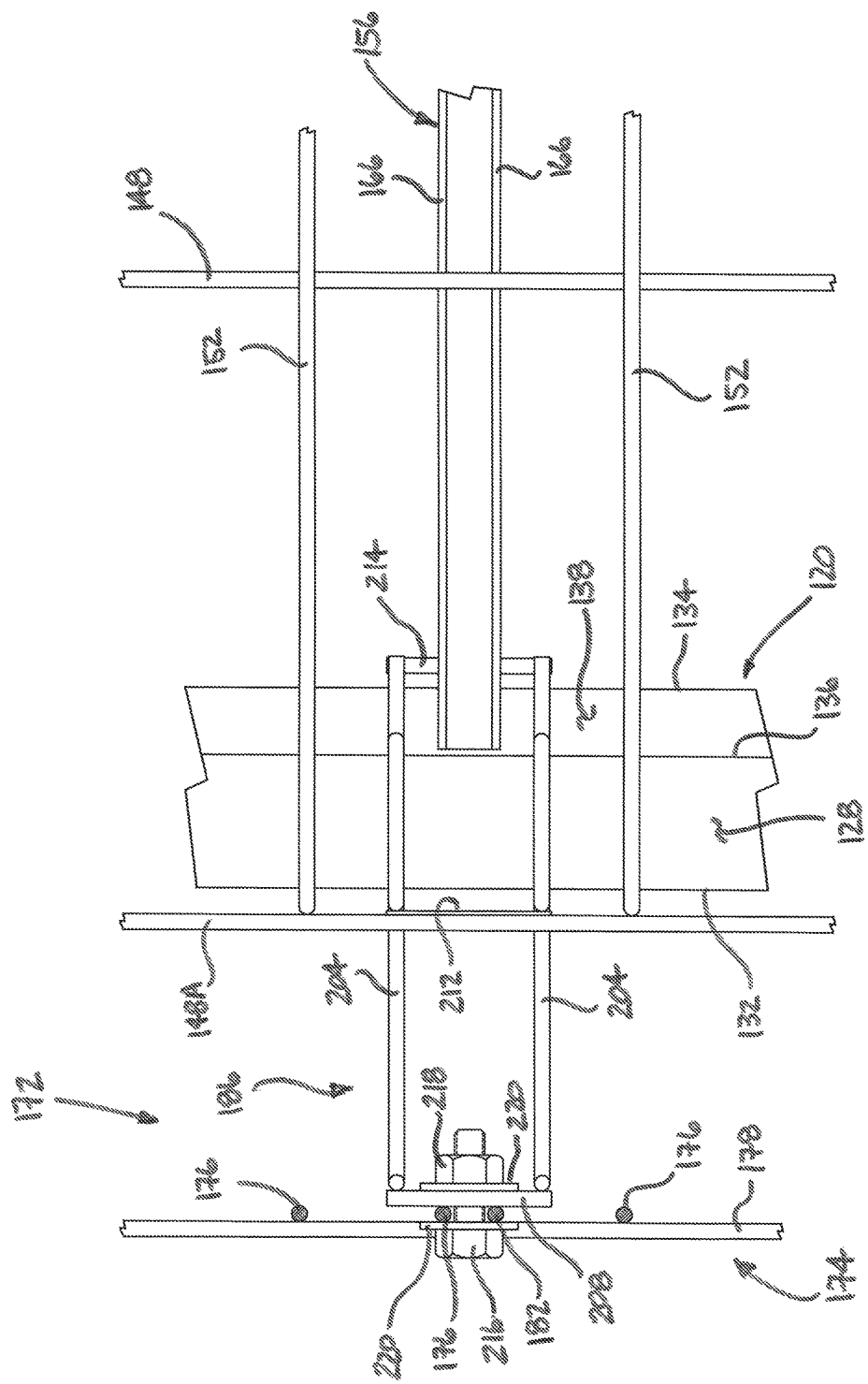
FIG. 10 is a top plan view of a portion of the storage rack assembly in FIG. 3 showing the storage deck of FIGS. 4-6 and the barrier panel assembly of FIGS. 7-9 installed on a storage rack structure.
Figure 11:
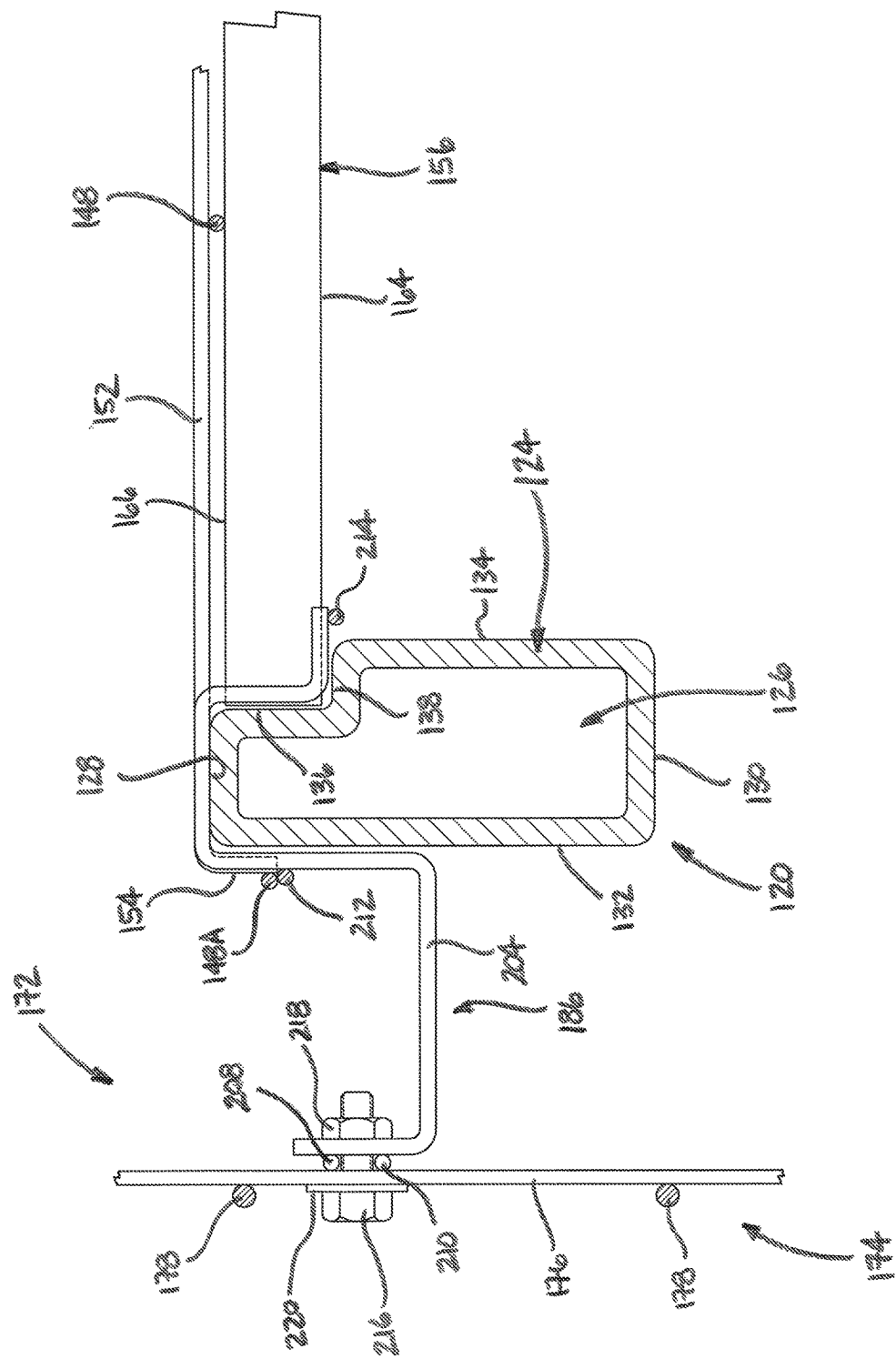
FIG. 11 is a cross-sectional side view of the portion of the storage rack assembly shown in FIG. 10.
Figure 12:
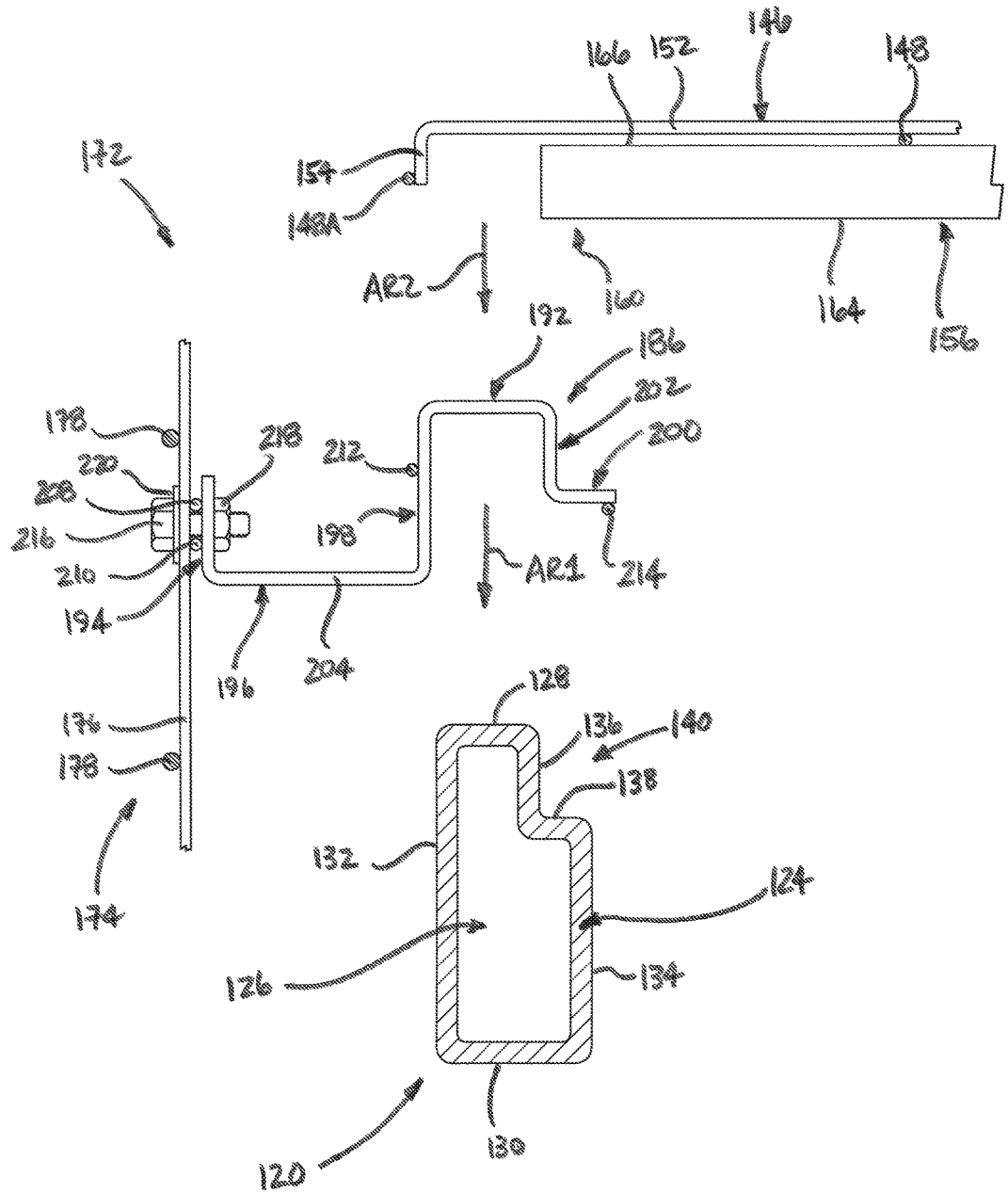
FIG. 12 is an exploded view of the portion of the storage rack assembly in FIGS. 10 and 11, shown prior to assembly.
Figure 13:
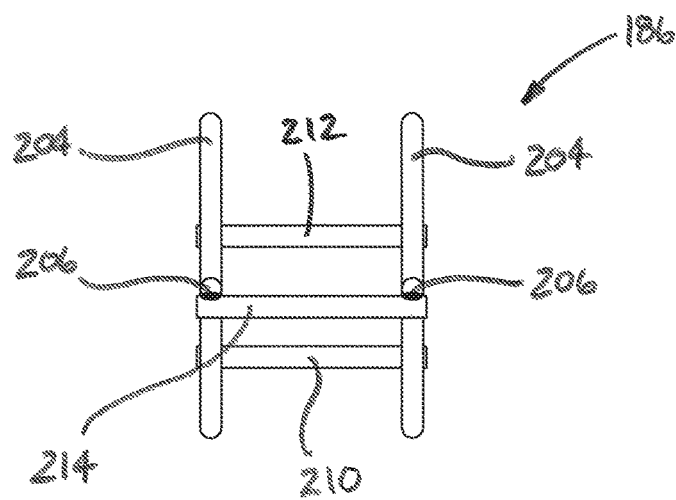
FIG. 13 is a front elevation view of one example of a mounting bracket in accordance with the subject matter of the present disclosure, such as is shown in FIGS. 7-12.
Figure 18:
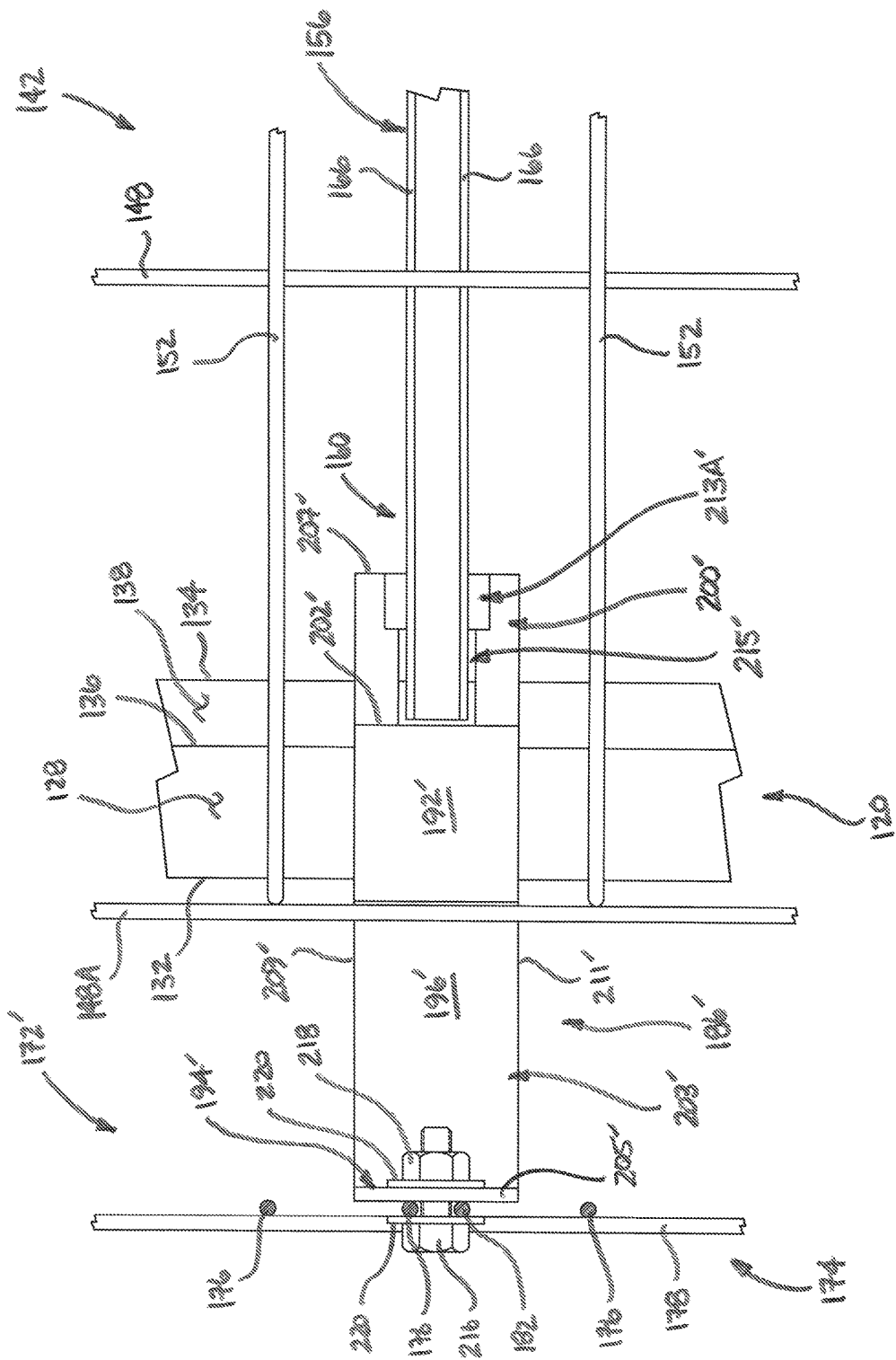
FIG. 18 is a top plan view of a portion of the storage rack assembly in FIG. 3 showing the storage deck of FIGS. 4-6 and the barrier panel assembly of FIG. 17 installed on a storage rack structure.
Figure 19:
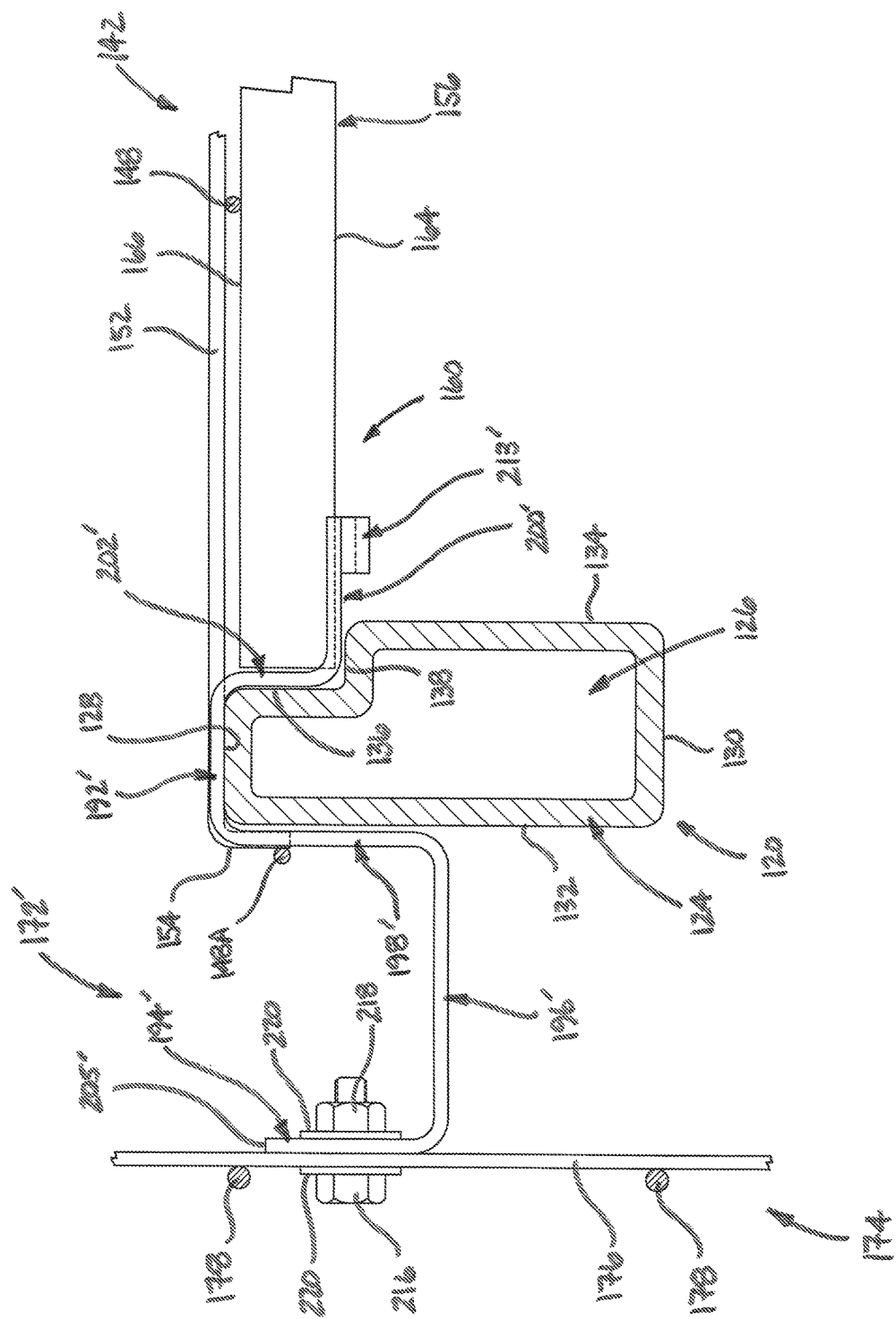
FIG. 19 is a cross-sectional side view of the portion of the storage rack assembly shown in FIG. 18.
Figure 20:
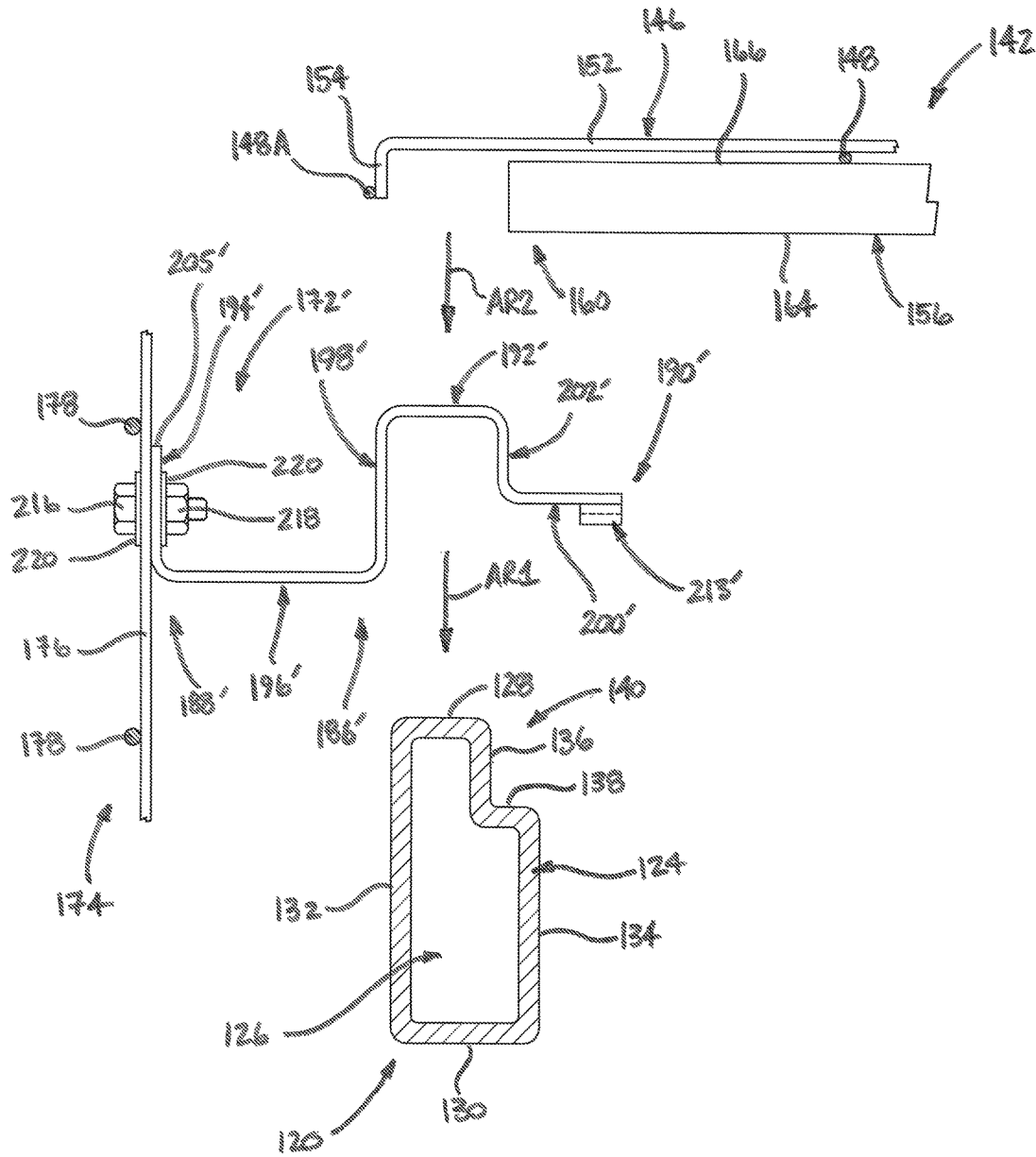
FIG. 20 is an exploded view of the portion of the storage rack assembly in FIGS. 18 and 19, shown prior to assembly.
Figure 21:
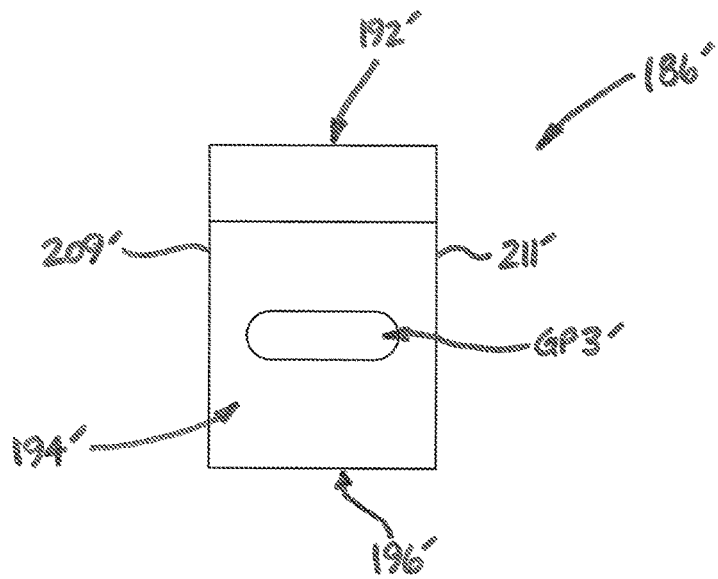
FIG. 21 is a front elevation view of another example of a mounting bracket in accordance with the subject matter of the present disclosure, such as is shown in FIGS. 17-20.
Figure 22:
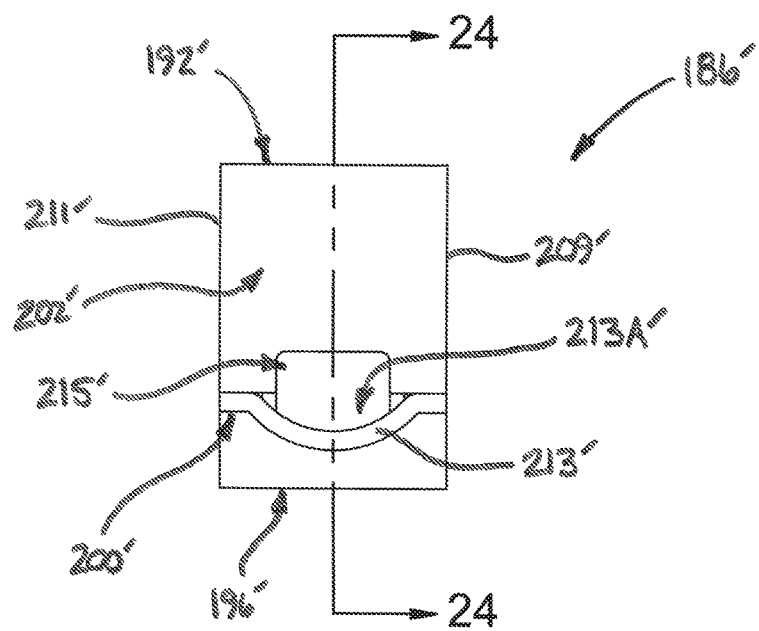
FIG. 22 is a rear elevation view of the mounting bracket in FIGS. 17-21.
Figure 23:
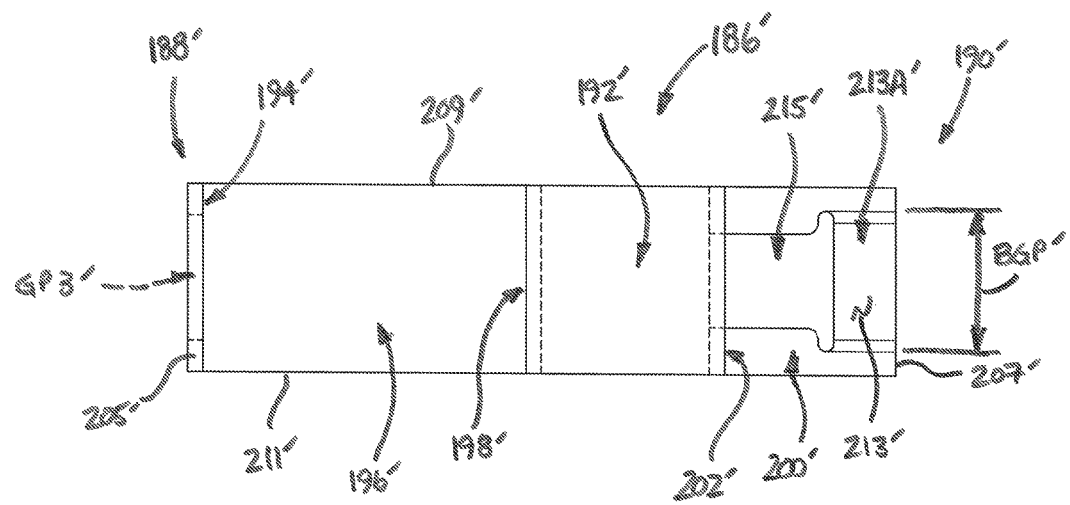
FIG. 23 is a top plan view of the mounting bracket in FIGS. 17-22.
Figure 24:
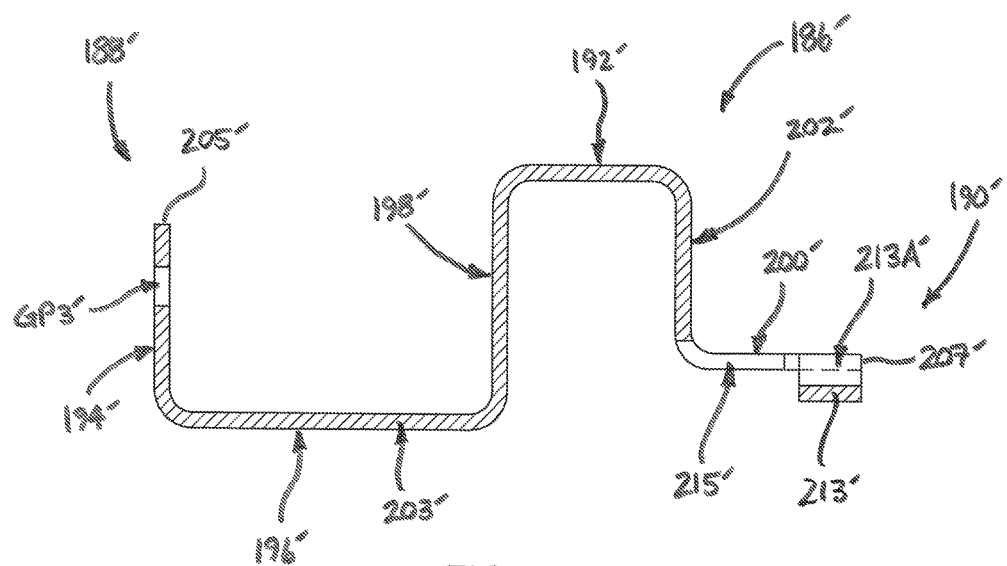
FIG. 24 is a side elevation view of the mounting bracket in FIGS. 17-23.

In a preferred arrangement, deck wires 146 are spaced apart from one another and/or edge wires 146A by deck offset dimension DOD1 that is greater than bracket width BKW of brackets 186 and 186'. In such an arrangement, brackets 186 and/or 186' can fit between adjacent ones of deck wires 146 and/or 146A, such as is shown in FIGS. 10 and 18, for example. Additionally, in a preferred arrangement, deck wires 148 are spaced apart from one another and/or edge wires 148A by deck offset dimension DOD2 that is greater than bracket length BKL of brackets 186 and 186'. In such an arrangement, brackets 186 and/or 186' can fit between adjacent ones of deck wires 148 and/or 148A, such as is shown in FIGS. 10 and 18, for example. Furthermore, in a preferred arrangement, support channels 156 can have a channel width (not identified) that is less than the width of bracket gap BGP (FIG. 15) and BGP' (FIG. 23) such that an end of the support channel can be at least partially received on or along a corresponding one of connector rods 214 and recess wall portion 213', such as is shown in FIGS. 10 and 18, for example.

Figure 25:
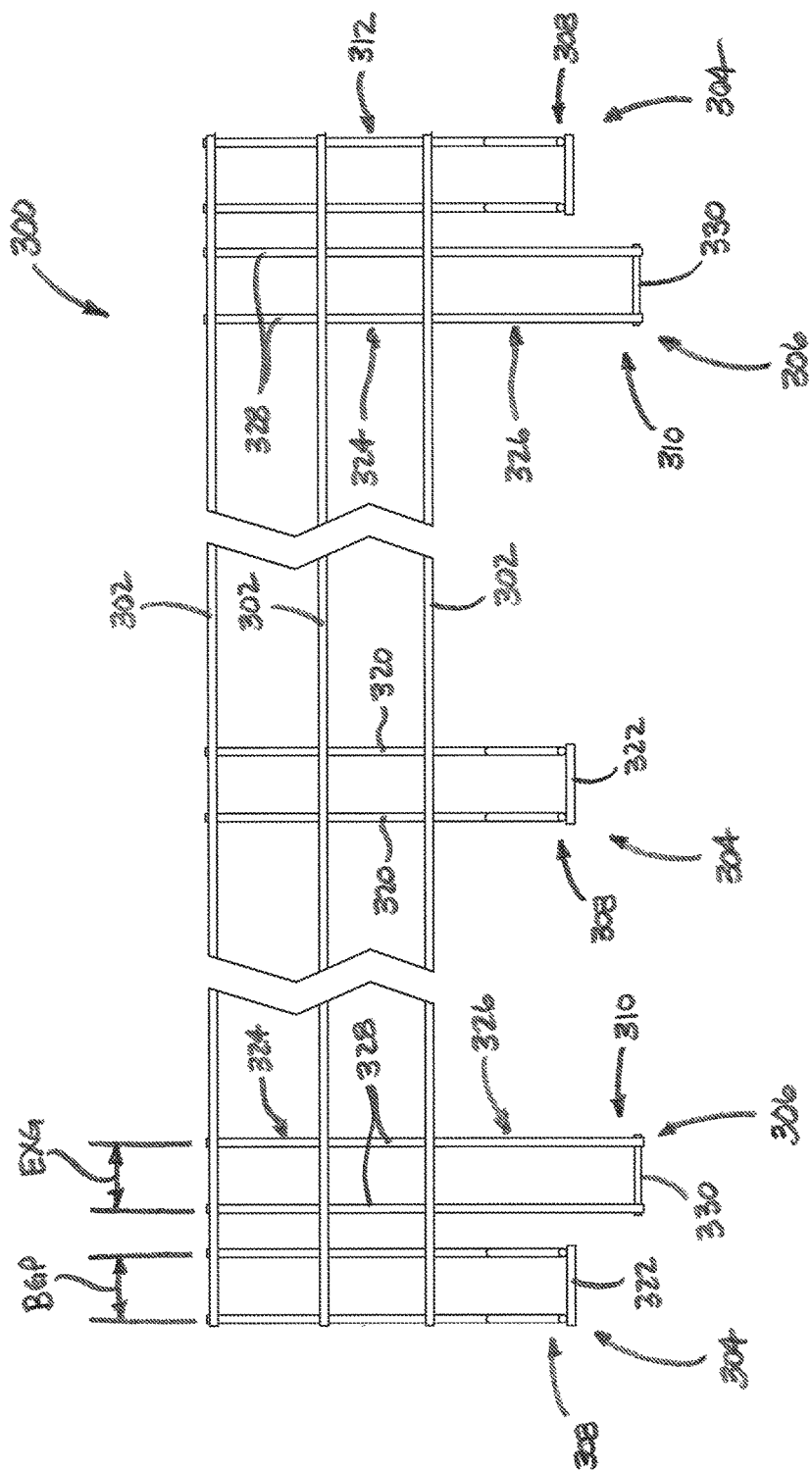
FIG. 25 is a front plan view of another example of a barrier panel assembly in accordance with the subject matter of the present disclosure, such as is shown in FIG. 2.
Figure 26:
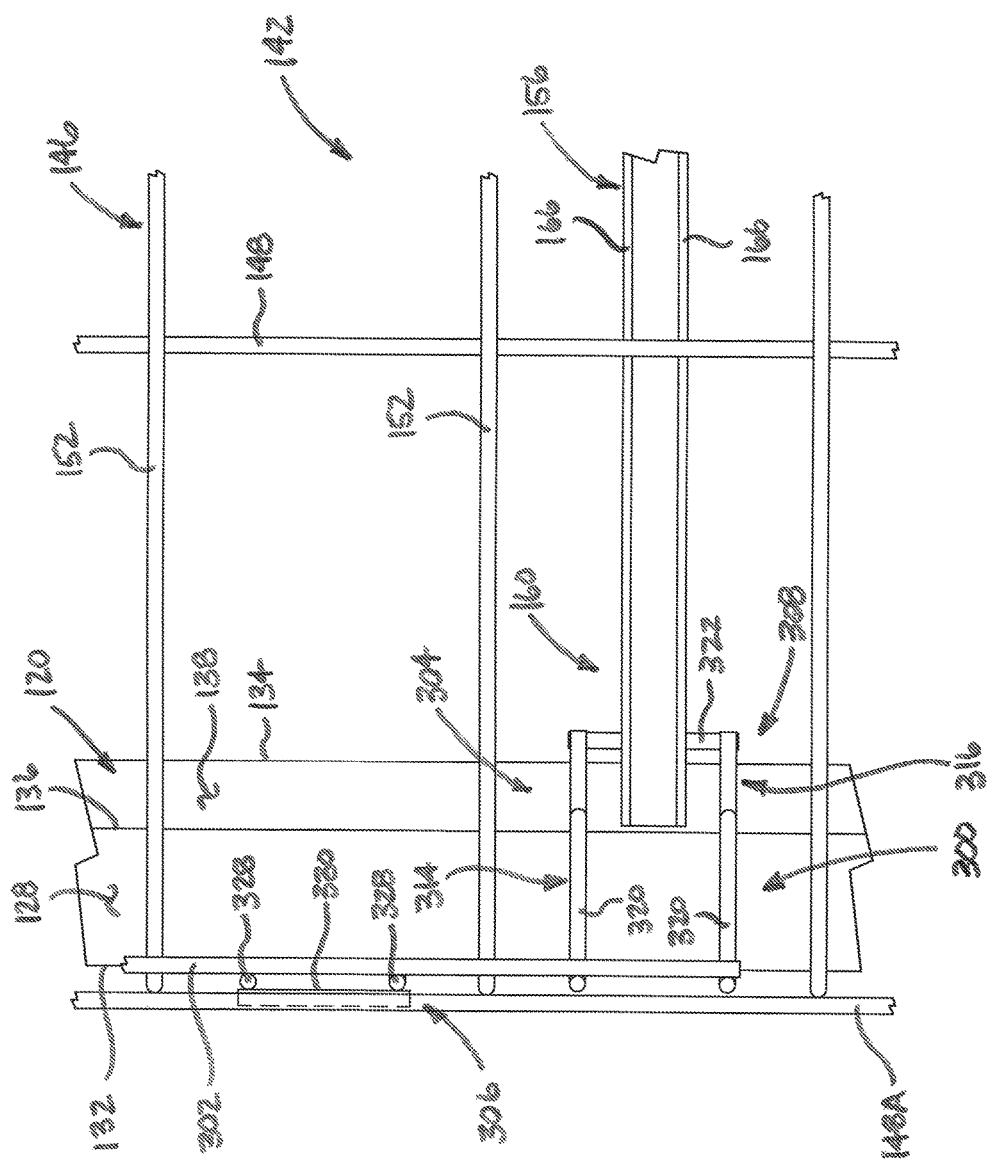
FIG. 26 is a top plan view of a portion of the storage rack assembly in FIGS. 2 and 3 showing the storage deck of FIGS. 4-6 and the barrier panel assembly of FIG. 25 installed on a storage rack structure.
Figure 27:
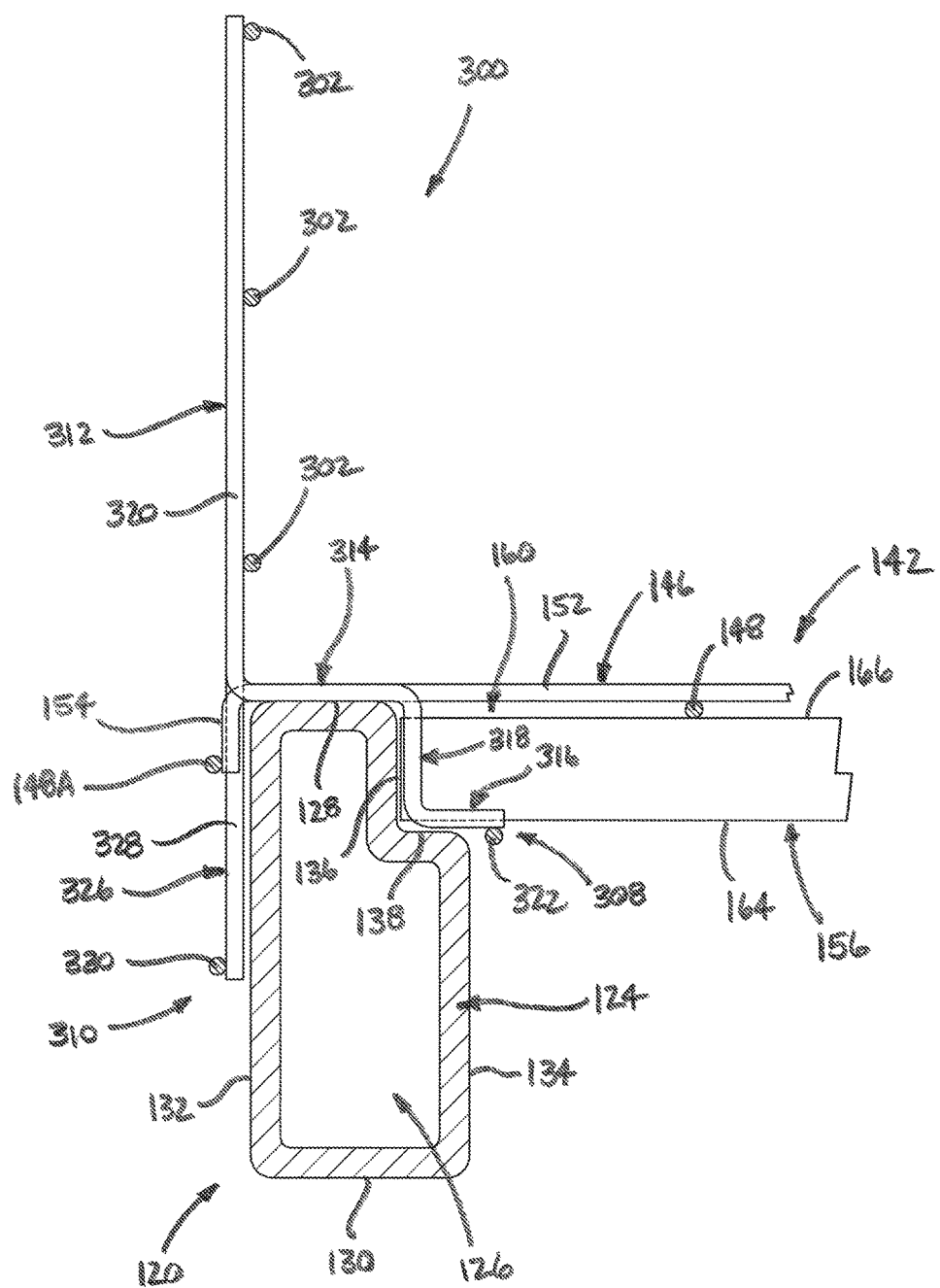
FIG. 27 is a cross-sectional side view of the portion of the storage rack assembly shown in FIG. 26.

In addition to, or as an alternative to, barrier panel assemblies 172 and 172', a storage rack assembly in accordance with the subject matter of the present disclosure can include barrier panel assemblies 300 that can be secured on or along one or more beams 120 of storage rack structure 102 without the use of fasteners extending between and operatively attach the barrier panel assemblies to the beams or columns of the storage rack structure. As shown in FIGS. 25-27, barrier panel assemblies 300 are, in a preferred arrangement, configured to be supported on or along a single one of beams 120 and can, in some cases, correspond to barrier panel assemblies 172B shown and described above in connection with FIG. 2.

In some cases, barrier panel assemblies can be formed from a barrier sheet and a plurality of support brackets and/or other components that are secured to the barrier sheet, such as in manners similar to those described in detail above in connection with barrier panel assemblies 172 and/or 172', for example. In other cases, however, barrier panel assemblies 300 can include barrier wires, support brackets, tab extensions and/or other components that are attached or otherwise secured to one another by way of flowed-material joints. As an example, barrier panel assemblies 300 are shown in FIGS. 25-30 and can include a plurality of barrier wires 302 that can be formed from a metal material (e.g., a steel alloy). The plurality of barrier wires can be disposed in a first orientation and can be spaced apart from one another by a barrier offset dimension BOD4 that is approximately uniform between adjacent ones of barrier wires 302.

Barrier panel assemblies 300 can also include a plurality of support brackets 304 and a plurality of tab extensions 306 that are attached or otherwise secured to barrier wires 302 by way of flowed-material joints (not shown). Support brackets 304 can extend from along barrier wires 302 to a distal end 308. Similarly, tab extensions 306 can extend from along the barrier wires to a distal end 310. Support brackets 304 and tab extensions 306 are shown as being oriented and extending in a lengthwise direction that is transverse to the orientation of barrier wires 302.

Support brackets 304 can include a securement section 312 disposed along and secured to barrier wires 302. An engagement section 314 can extend from securement section 312, and can be dimensioned to abuttingly engage top surface 128 of one of beams 120. A projection section 316 can be disposed along distal end 308 and can be oriented in approximate alignment with engagement section 314. Projection section 316 can be positioned in offset relation to engagement section 314. Additionally, support brackets 304 can include an offset section 318 extends between and operatively connects engagement section 314 and projection section 316 in offset relation to one another.

Support brackets 304 can be formed from any suitable material or combination of materials, and from any combination of one or more component parts. As one example, support brackets 304 as well as the sections and features thereof can be formed from any combination of one or more rigid wires and/or rod elements and/or any portions thereof, such as shown in FIGS. 25-30, for example. Support brackets 304 can include bracket wires or rods 320 that extend lengthwise between securement section 312 and distal end 308. In some cases, the bracket rods can be formed from two portions of a common length of wire or rod material. In other cases, bracket rods 320 can be formed from two different segments of wire or rod material. In either case, bracket rods 320 are disposed in spaced relation to one another in a widthwise direction such that an interior opening or gap is formed therebetween, such as is represented in FIG. 25 by reference dimension BGP.

In such a construction, bracket rods 320 are bent or otherwise formed into an approximately common shape such that the bracket rods can together form one or more of sections 312-318 of support brackets 304. Support brackets 304 can also include one or more connector wires or rods that extend between and operatively connect bracket rods 320 to one another in a suitable manner, such as by way of one or more flowed-material joints (not shown), for example. It will be appreciated that any suitable number and/or arrangement of connector rods can be used. For example, support brackets 304 can include connector rods 322 extending between and operatively connecting bracket rods 320 to one another along projection section 316.

Tab extensions 306 can include a securement section 324 disposed along and secured to barrier wires 302. An engagement section 326 can extend from securement section 312, and can be dimensioned to abuttingly engage one of the side surfaces (e.g., side surface 132) of one of beams 120. As with support brackets 304, tab extensions 306 can be formed from any suitable material or combination of materials, and from any combination of one or more component parts. As one example, tab extensions 306 as well as the sections and features thereof can be formed from any combination of one or more rigid wires and/or rod elements and/or any portions thereof, such as shown in FIGS. 25-30, for example. Tab extensions 306 can include extension wires or rods 328 that extend lengthwise between securement section 324 and distal end 310. In some cases, the extension rods can be formed from two portions of a common length of wire or rod material. In other cases, extension rods 328 can be formed from two different segments of wire or rod material. In either case, extension rods 328 are disposed in spaced relation to one another in a widthwise direction such that an interior opening or gap is formed therebetween, such as is represented in FIG. 25 by reference dimension EXG.

In such a construction, extension rods 328 have an approximately common shape such that the bracket rods can together form one or more of sections 324 and 326 of extension tab 306. Extension tabs 306 can also include one or more connector wires or rods that extend between and operatively connect extension rods 328 to one another in a suitable manner, such as by way of one or more flowed-material joints (not shown), for example. It will be appreciated that any suitable number and/or arrangement of connector rods can be used. For example, extension tabs 306 can include connector rods 330 extending between and operatively connecting extension rods 328 to one another along engagement section 326.

As discussed above, one desired feature of the subject matter of the present disclosure is to provide a construction in which barrier panel assemblies 300 can be secured on or along one or more beams 120 of storage rack structure 102 without the use of fasteners extending between and operatively attach the barrier panel assemblies to the beams or columns of the storage rack structure. One manner in which such a construction can be achieved includes installing one of storage decks 142 on or along storage rack structure 102 with the storage deck abuttingly engaging a suitable combination of two or more of the front beam, rear beam and side beams of a given storage bay. In installing one of storage decks 142 in such a manner, at least a portion of the storage deck can extend over and capture at least a portion of barrier panel assemblies 300 between the storage deck and an associated one of beams 120 of storage rack structure 102.

Figure 28:
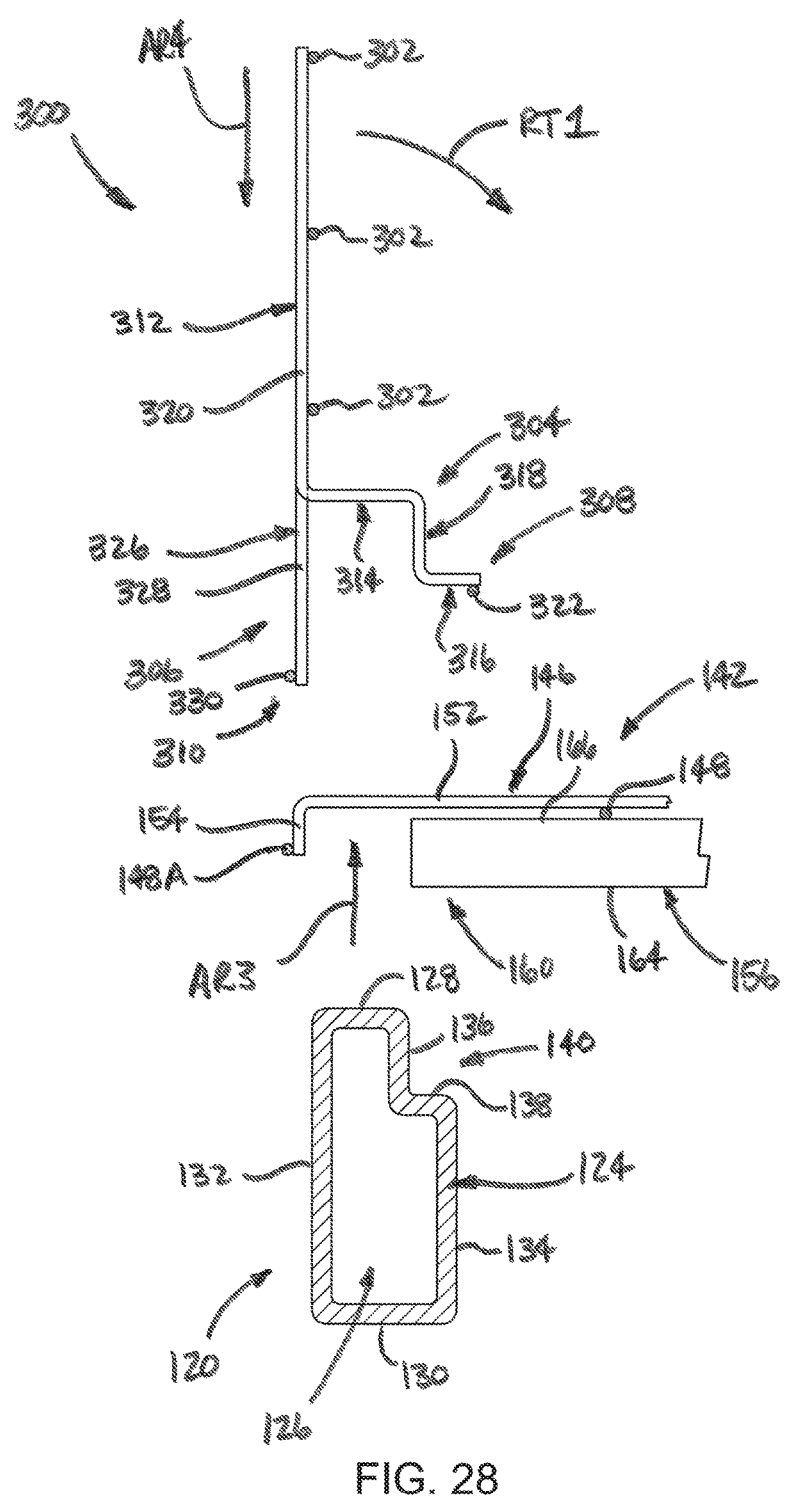

In assembling a storage rack assembly in accordance with the subject matter of the present disclosure (e.g., storage rack assembly 100) that includes a barrier panel assembly, such as barrier panel assembly 300, for example, storage deck 142 may be preinstalled within one of storage bays 140. In such cases, storage deck 142 can be lifted, raised or otherwise disengaged from one or more beams 120 of storage rack structure 102, as is represented in FIG. 28 by arrow AR3. In other cases, barrier panel assembly 300 can be positioned adjacent to storage deck 142 prior to assembly, such as is illustrated in FIG. 28. In such cases, barrier panel assembly is preferably operatively engaged with storage deck 142 prior to installation (or re-installation) of the storage deck (and the barrier panel assembly) on or along beams 120 of storage rack structure 102.

Figure 29:
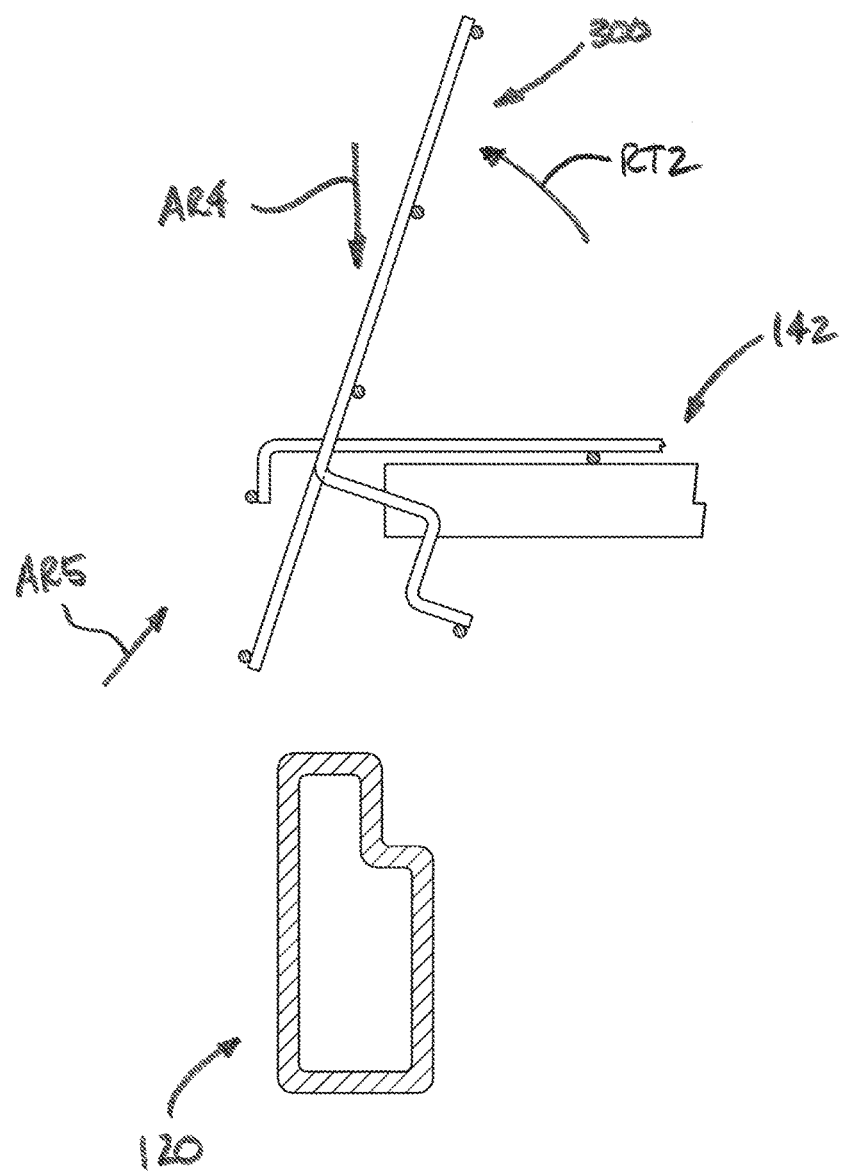

It will be appreciated that barrier panel assembly 300 can be operatively engaged with storage deck 142 in any suitable manner. As one example, barrier panel assembly 300 can be displaced toward storage deck 142 such that one or more of sections 314-318 of support brackets 304 and engagement section 326 of extension tabs 306 extend into and through storage deck 142, as is represented in FIGS. 28 and 29 by arrows AR4. In some cases, it may be beneficial to tilt or rotate barrier panel assembly 300 to facilitate assembly, such as is represented in FIG. 28 by arrow RT1. In such case, the barrier panel assembly can be tilted or rotated in an opposing direction to establish engagement with storage deck 142, as is represented in FIG. 29 by arrow RT2. In a preferred arrangement, support brackets 304 and tab extensions 306 can be disposed between different pairs of adjacent deck wires 146. Additionally, support brackets can be dimensioned (e.g., with bracket gap BGP) to at least partially receive an end of one of support channels 156 between bracket wires 320. In such cases, it may be desirable to displace barrier panel assemblies 300 laterally to position the end of support channel 156 between bracket wires 320, as is represented in FIG. 29 by arrow AR5.

Once barrier panel assembly 300 has been operatively engaged with storage deck 142, as is shown in FIG. 30, for example, the barrier panel assembly and storage deck can be displaced together toward and into engagement with one of beams 120 of storage rack structure 102, as is represented in FIG. 30 by arrow AR6. In an assembled condition on the storage rack structure, support brackets 304 can be operatively engaged with one of beams 120. In such case, engagement sections 314 can be disposed on or along top surface 128 and/or projection sections 316 can be disposed one or along shoulder surface 138. Additionally, in such case, offset sections 318 can be disposed along side surface 134 or 136. Furthermore, in such an arrangement, engagement sections 326 of tab extensions 306 can be disposed along side surface 132 of beam 120. In this manner, barrier panel assemblies 300 can be vertically and laterally supported on or along beams 120 of storage rack structure 102.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially permanent connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A storage rack assembly disposed on an associated base surface and having a front side and a rear side, said storage rack assembly comprising:
    a storage rack structure including a plurality of columns and a plurality of beams extending between and interconnecting said plurality of columns such that a storage bay is formed at a non-zero height above the associated base surface, said storage bay including a front opening and at least one of a rear opening and a side opening, at least a first set of beams of said plurality of beams including a top surface and an outer side surface with a first set of beams disposed in spaced relation to one another in a first direction and a second set of beams disposed in spaced relation to one another in a second direction that is oriented transverse to said first direction such that said storage bay has a first bay dimension between said outer side surfaces of said first set of beams;
    a storage deck supported on said storage rack structure within said storage bay, said storage deck operatively engaging one or more of said plurality of beams to form a floor of said storage bay, said storage deck including a storage deck sheet that is at least partially formed from first and second pluralities of deck wires arranged in a grid pattern and interconnected with one another by flowed-material joints, said first plurality of deck wires including:
        a deck portion extending longitudinally in said second direction between opposing first and second deck-wire ends; and,
        first and second extension portions respectively disposed along said first and second deck-wire ends, said first and second extension portions extending from said deck portion in a heightwise direction that is transverse to said first and second directions; and,
    a barrier panel assembly extending across one of said rear opening and said side opening of said storage bay and including a plurality of support brackets;
    said storage deck having a deck dimension in said second direction between said first and second extension portions of said first plurality of deck wires that is greater than said first bay dimension such that said first plurality of deck wires extend across said top surfaces of said first set of beams with first and second extension portions coextensive in said heightwise direction with said outer side surfaces of said first set of beams and such that said plurality of support brackets are captured by said storage deck on said one or more of said plurality of beams thereby securing said barrier panel assembly to said storage rack structure.

2. A storage rack assembly according to claim 1, wherein said barrier panel assembly includes a barrier sheet to which each of said plurality of support brackets is secured.

3. A storage rack assembly according to claim 2, wherein said barrier sheet includes an outer periphery with each of said plurality of support brackets disposed in inwardly-spaced relation to said outer periphery of said barrier sheet.

4. A storage rack assembly according to claim 2, wherein said barrier sheet includes a plurality of barrier wires arranged in a grid pattern and interconnected with one another by a plurality of flowed-material joints.

5. A storage rack assembly according to claim 4, wherein said barrier sheet has an approximately rectangular shape with a sheet length and a sheet width, said plurality of barrier wires including first and second pluralities of barrier wires, said first plurality of barrier wires extending in a lengthwise direction and spaced apart from one another in a widthwise direction, said second plurality of barrier wires oriented generally transverse to said first plurality of barrier wires such that said second plurality of barrier wires extend in said widthwise direction and in spaced-apart relation to one another in said lengthwise direction.

6. A storage rack assembly according to claim 5, wherein said plurality of support brackets have an approximately uniform bracket width, said first plurality of barrier wires are spaced apart from one another by a first offset dimension, said second plurality of barrier wires are spaced apart from one another by a second offset dimension, and said plurality of barrier wires of said barrier sheet include a third plurality of barrier wires oriented generally transverse to said first plurality of barrier wires and oriented in approximate alignment with said second plurality of barrier wires, said third plurality of barrier wires disposed in spaced relation to one another in said lengthwise direction and positioned adjacent different ones of said second plurality of barrier wires such that adjacent ones of said second plurality of barrier wires and said third plurality of barrier wires spaced apart from one another by a third offset dimension that is less than said bracket width of said plurality of support brackets.

7. A storage rack assembly according to claim 1, wherein said plurality of support brackets have an approximately uniform bracket width, and said first plurality of deck wires are spaced apart from one another by a first offset dimension and said second plurality of deck wires spaced apart from one another by a second offset dimension, said first and second offset dimensions being greater than said bracket width such that each of said plurality of support brackets fit between adjacent ones of said first plurality of deck wires or said second plurality of deck wires as said plurality of support brackets are captured between said storage deck and said one or more of said plurality of beams of said storage rack structure.

8. A storage rack assembly according to claim 1, wherein said storage deck includes a plurality of support channels extending lengthwise in said second direction across said deck sheet, said plurality of support channels disposed in spaced relation to one another in said first direction with said plurality of support brackets including a portion disposed along one of said plurality of support channels opposite said storage deck.

9. A storage rack assembly disposed on an associated base surface and having a front side and a rear side, said storage rack assembly comprising:
  a storage rack structure including a plurality of columns as well as a front beam, a rear beam, a first side beam and a second side beam extending between and interconnecting two of said plurality of columns such that a storage bay is formed at a non-zero height above the associated base surface, said storage bay including a front opening and at least one of a rear opening and a side opening, and each of said front beam, said rear beam, said first side beam and said second side beam including a top surface and an outer side surface oriented transverse to said top surface with said outer side surface having a height;
  a storage deck supported on said storage rack structure within said storage bay, said storage deck including a storage deck sheet that is at least partially formed from first and second pluralities of deck wires arranged in a grid pattern and interconnected with one another by flowed-material joints, said first plurality of deck wires including:
    a deck portion extending longitudinally between opposing first and second deck-wire ends; and,
    first extension portions disposed along said first deck-wire ends, said first extension portions extending from said deck portion in a heightwise direction;
  said storage deck supported on two or more of said front beam, said rear beam, said first side beam and said second side beam to form a floor of said storage bay with said first deck-wire ends of said first plurality of deck wires extending across said top surface of one of said rear beam, said first side beam and said second side beam such that said first extension portions are disposed along and coextensive with said outer side surface of said one of said rear beam, said first side beam and said second side beam; and,
  a barrier panel assembly extending across one of said rear opening and said side opening of said storage bay, said barrier panel assembly including a barrier sheet and a plurality of support brackets secured to said barrier sheet, said barrier panel assembly positioned along said one of said rear beam, said first side beam and said second side beam such that one of said plurality of support brackets is captured by said storage deck on said top surface of said one of said rear beam, said first side beam and said second side beam thereby securing said barrier panel assembly on said storage rack structure.

10. A storage rack assembly according to claim 9, wherein each of said front beam, said first side beam and said second side beam includes a bottom surface, an outward-facing surface, a first inward-facing surface and a second inward-facing surface disposed in inwardly-spaced relation to said first inward-facing surface such that a shoulder surface extends therebetween.

11. A storage rack assembly according to claim 10, wherein said storage deck is supported on said storage rack structure by abuttingly engaging at least one of said top surface and said shoulder surface of said two or more of said front beam, said rear beam, said first side beam and said second side beam.

12. A storage rack assembly according to claim 11, wherein said barrier sheet includes an outer periphery with each of said plurality of support brackets disposed in inwardly-spaced relation to said outer periphery of said barrier sheet.

13. A storage rack assembly according to claim 9, wherein said barrier sheet includes a plurality of barrier wires arranged in a grid pattern and interconnected with one another by a plurality of flowed-material joints.

14. A storage rack assembly according to claim 9, wherein said plurality of support brackets include a proximal end secured along said barrier sheet and a distal end opposite said proximal end and spaced apart from said proximal end, said plurality of support brackets configured to abuttingly engage said top surface of one or more of said rear beam, said first side beam and said second side beam such that said storage deck is supported on said one or more of said rear beam, said first side beam and said second side beam overtop of at least one of said plurality of brackets to thereby capture said at least one of said plurality of brackets and secure said barrier panel assembly on said storage rack structure.

15. A storage rack assembly according to claim 14, wherein said plurality of support brackets include a plurality of bracket sections including an engagement section disposed between said proximal and distal ends, said engagement section dimensioned to abuttingly engage said top surface of said one or more of said rear beam, said first side beam and said second side beam of said storage rack structure.

16. A storage rack assembly according to claim 15, wherein said plurality of bracket sections of said plurality of support brackets each include a securement section disposed along said proximal end and oriented transverse to said engagement section, said securement section dimensioned for operative engagement with said barrier sheet.

17. A storage rack assembly according to claim 16, wherein said plurality of bracket sections of said plurality of support brackets include an extension section oriented transverse to said securement section, said extension section offset from but oriented in approximate alignment with said engagement section, said extension section projecting toward said distal end from along said securement section such that a securement gap is formed between said engagement section and said securement section.

18. A storage rack assembly according to claim 17, wherein said plurality of bracket sections of said plurality of support brackets include a first offset section oriented transverse to said engagement section, said first offset section offset from but oriented in approximate alignment with said securement section, said first offset section extending between and operatively connecting said engagement section and said extension section such that a first offset dimension is formed therebetween.

19. A storage rack assembly according to claim 18, wherein said plurality of bracket sections of said plurality of support brackets include a projection section disposed along said distal end and oriented in approximate alignment with said engagement section.

20. A storage rack assembly according to claim 19, wherein said plurality of bracket sections of said plurality of support brackets include a second offset section oriented transverse to said engagement and projection sections, said second offset section extending between and operatively connecting said engagement section and said projection section such that a second offset dimension is formed therebetween, said engagement and extension sections defining a height of said plurality of support brackets, and said first offset dimension being greater than said second offset dimension such that said projection section is disposed in between said engagement section and said extension section in a heightwise direction.

* * * * *